(12) United States Patent
Yoon et al.

(10) Patent No.: US 12,113,374 B2
(45) Date of Patent: Oct. 8, 2024

(54) AUGMENTED REALITY DEVICE AND METHOD FOR CONTROLLING THE SAME

(71) Applicant: Samsung Electronics Co., Ltd., Gyeonggi-do (KR)

(72) Inventors: Jongmin Yoon, Gyeonggi-do (KR); Seungnyun Kim, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 17/894,284

(22) Filed: Aug. 24, 2022

(65) Prior Publication Data

US 2023/0069217 A1     Mar. 2, 2023

Related U.S. Application Data

(63) Continuation of application No. PCT/KR2022/011989, filed on Aug. 11, 2022.

(30) Foreign Application Priority Data

Aug. 27, 2021   (KR) ........................ 10-2021-0114170

(51) Int. Cl.
  *H02J 50/80*     (2016.01)
  *G06T 19/00*     (2011.01)
  *H02J 50/90*     (2016.01)

(52) U.S. Cl.
  CPC ............ *H02J 50/80* (2016.02); *G06T 19/006* (2013.01); *H02J 50/90* (2016.02)

(58) Field of Classification Search
  CPC .......... G06T 19/006; H02J 50/80; H02J 50/90
  See application file for complete search history.

(56) References Cited

U.S. PATENT DOCUMENTS

| 2012/0235883 A1 | 9/2012 | Border et al. |
| 2016/0344241 A1 | 11/2016 | Hong |

(Continued)

FOREIGN PATENT DOCUMENTS

| JP | 2006-314181 A | 11/2006 |
| KR | 10-2014-0060110 A | 5/2014 |

(Continued)

OTHER PUBLICATIONS

International Search Report dated Nov. 23, 2022.

*Primary Examiner* — Kee M Tung
*Assistant Examiner* — Jed-Justin Imperial
(74) *Attorney, Agent, or Firm* — Cha & Reiter, LLC

(57) ABSTRACT

According to various embodiments, an augmented reality device may comprise a display, at least one camera, a communication circuit, and at least one processor operatively connected with the display, the at least one camera, and the communication circuit. The at least one processor may be configured to obtain a first image through the at least one camera, identify that a wireless power receiver and a wirelesspower transmitter configured to transmit wireless power to the wirelesspower receiver are included in the first image, receive information regarding the wireless power from the wirelesspower receiver through the communication circuit, and display, on the display, an augmented reality object indicating an arrangement of at least one of the wirelesspower transmitter or the wirelesspower receiver, based on the information regarding the wireless power.

20 Claims, 14 Drawing Sheets

(56) References Cited

U.S. PATENT DOCUMENTS

| | | |
|---|---|---|
| 2017/0212574 A1 | 7/2017 | Kang et al. |
| 2017/0248799 A1 | 8/2017 | Streets et al. |
| 2018/0287413 A1 | 10/2018 | Jung |
| 2018/0323660 A1 | 11/2018 | Lee |
| 2019/0098227 A1 | 3/2019 | Park et al. |
| 2020/0042795 A1* | 2/2020 | Lee .................. G06F 9/453 |
| 2020/0358302 A1 | 11/2020 | Kramar et al. |
| 2021/0241537 A1 | 8/2021 | Ahn |

FOREIGN PATENT DOCUMENTS

| | | |
|---|---|---|
| KR | 10-2014-0086277 A | 7/2014 |
| KR | 10-2015-0049340 A | 5/2015 |
| KR | 10-2017-0088204 A | 8/2017 |
| KR | 10-2019-0035116 A | 4/2019 |
| KR | 10-2020-0027153 A | 3/2020 |
| KR | 10-2020-0049750 A | 5/2020 |
| KR | 10-2020-0056481 A | 5/2020 |
| KR | 10-2021-0086834 A | 7/2021 |

\* cited by examiner

AUGMENTED REALITY DEVICE AND METHOD FOR CONTROLLING THE SAME

CROSS REFERENCE TO RELATED APPLICATIONS

This application is a continuation of International Application No. PCT/KR2022/011989, which was filed on Aug. 11, 2022, and claims priority to Korean Patent Application No. 10-2021-0114170, filed on Aug. 27, 2021, in the Korean Intellectual Property Office, the disclosure of which is herein incorporated by reference in its entirety for all purposes.

FIELD

Various embodiments relate to an augmented reality device and a method for controlling the augmented reality device.

BACKGROUND

Augmented reality (AR) is technology for overlaying three-dimensional (3D) (or two-dimensional (2D)) virtual images on the real-world image or background and displaying overlaid images. AR technology which combines the real-world environment with virtual objects enables the user to view the real-world environment, thereby providing a better real-life feel and additional information.

AR devices may allow images provided through a projector to be incident through a prism to the input grating surface. The user may then view the image passing the output grating surface with his eyes. The user may observe the image together with the real-world environment and identify information about a target object in the environment that he is currently viewing.

If a power transmitting unit (PTU) (e.g., a wireless charging pad) and a power receiving unit (PRU) (e.g., a smartphone) come in contact or close to each other within a predetermined distance, the battery of the power receiving unit may be charged by electromagnetic induction or electromagnetic resonance between the transmission coil of the power transmitting unit and the reception coil of the power receiving unit. To seamlessly perform wireless charging, it is required that the transmission coil of the power transmitting unit and the reception coil of the power receiving unit are arranged in appropriate positions.

SUMMARY

According to an embodiment, an augmented reality device may comprise a display, at least one camera, a communication circuit, and at least one processor operatively connected with the display, the at least one camera, and the communication circuit. The at least one processor may be configured to obtain a first image through the at least one camera, identify that a wireless power receiver and a wireless power transmitter configured to transmit wireless power to the wireless power receiver are included in the first image, receive information regarding the wireless power from the wireless power receiver through the communication circuit, and display, on the display, an augmented reality object indicating an arrangement of at least one of the wireless power transmitter or the wireless power receiver, based on the information regarding the wireless power.

According to an embodiment, a method performed in an augmented reality device may comprise obtaining a first image through at least one camera of the augmented reality device, identifying that at least one of a wireless power transmitter configured to transmit wireless power to a wireless power receiver or the wireless power receiver is included in the first image, receiving information regarding the wireless power from the wireless power receiver through a communication circuit of the augmented reality device, and displaying, on a display, an augmented reality object indicating an arrangement of at least one of the wireless power transmitter or the wireless power receiver, based on the information regarding the wireless power.

According to an embodiment, an augmented reality device may comprise a display, at least one camera, a communication circuit, and at least one processor operatively connected with the display, the at least one camera, and the communication circuit. The at least one processor may be configured to obtain an image through the at least one camera, identify that at least one of a shape of a surface where a wireless power transmitter configured to transmit wireless power to a wireless power receiver or the wireless power receiver is included in the obtained image, receive information regarding the wireless power from the wireless power receiver through the communication circuit, and display, on the display, an augmented reality object indicating an arrangement of the surface and the wireless power receiver, based on the information regarding the wireless power.

DETAILED DESCRIPTION

Figure 1:
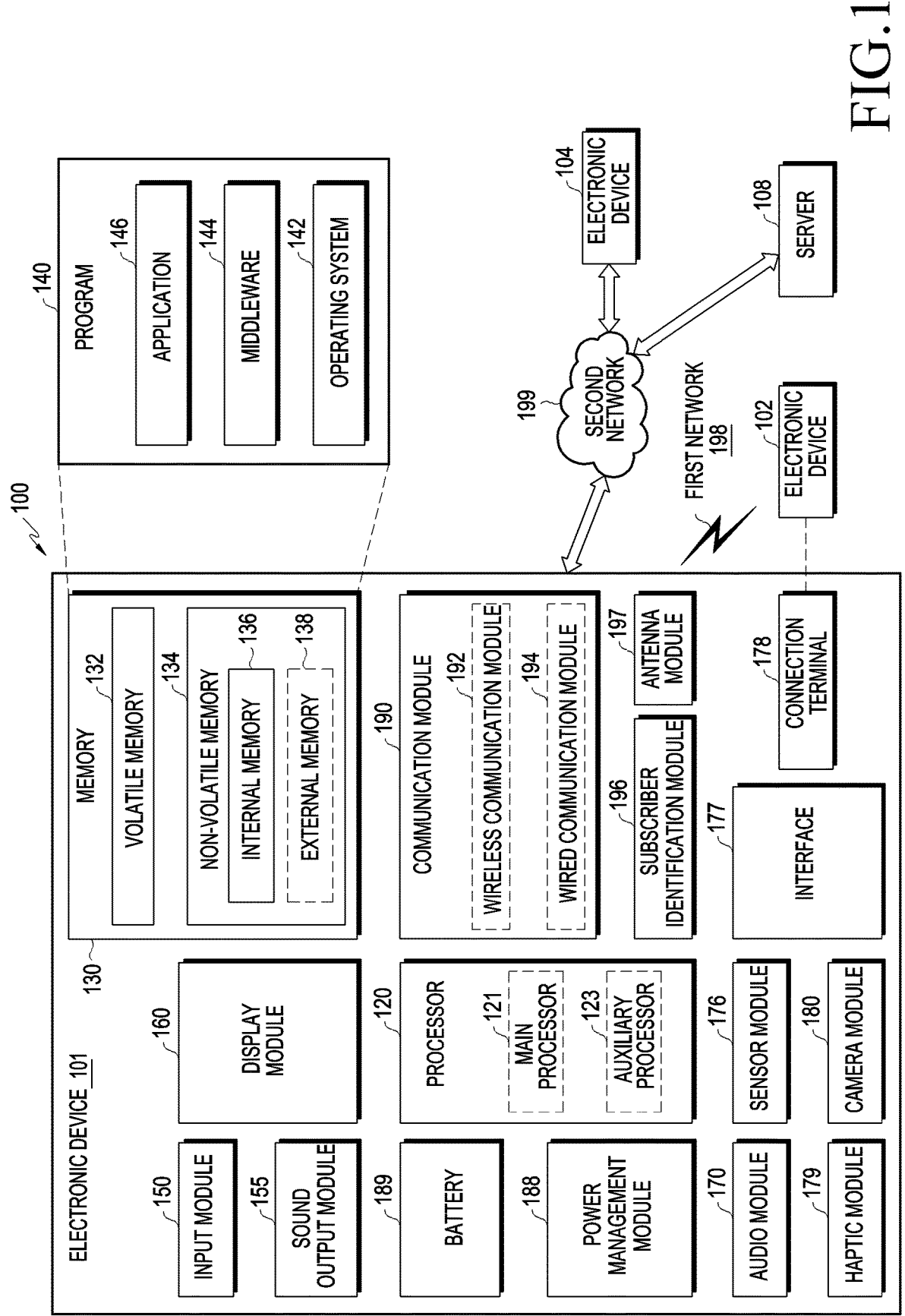
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

According to an embodiment, an augmented reality device may display an augmented reality object for leading the user to arrange the power transmitting unit and the power receiving unit in appropriate positions.

According to an embodiment, an augmented reality device and a method for controlling the augmented reality device are provided. According to an embodiment, the augmented reality device may lead the user to arrange the power transmitting unit and the power receiving unit in appropriate positions by displaying an augmented reality object indicating an arrangement of at least one of the power transmitting unit or the power receiving unit on the display. Therefore, according to an embodiment, the augmented reality device may enable efficient wireless power transmission between the power transmitting unit and the power receiving unit.

Figure 2:
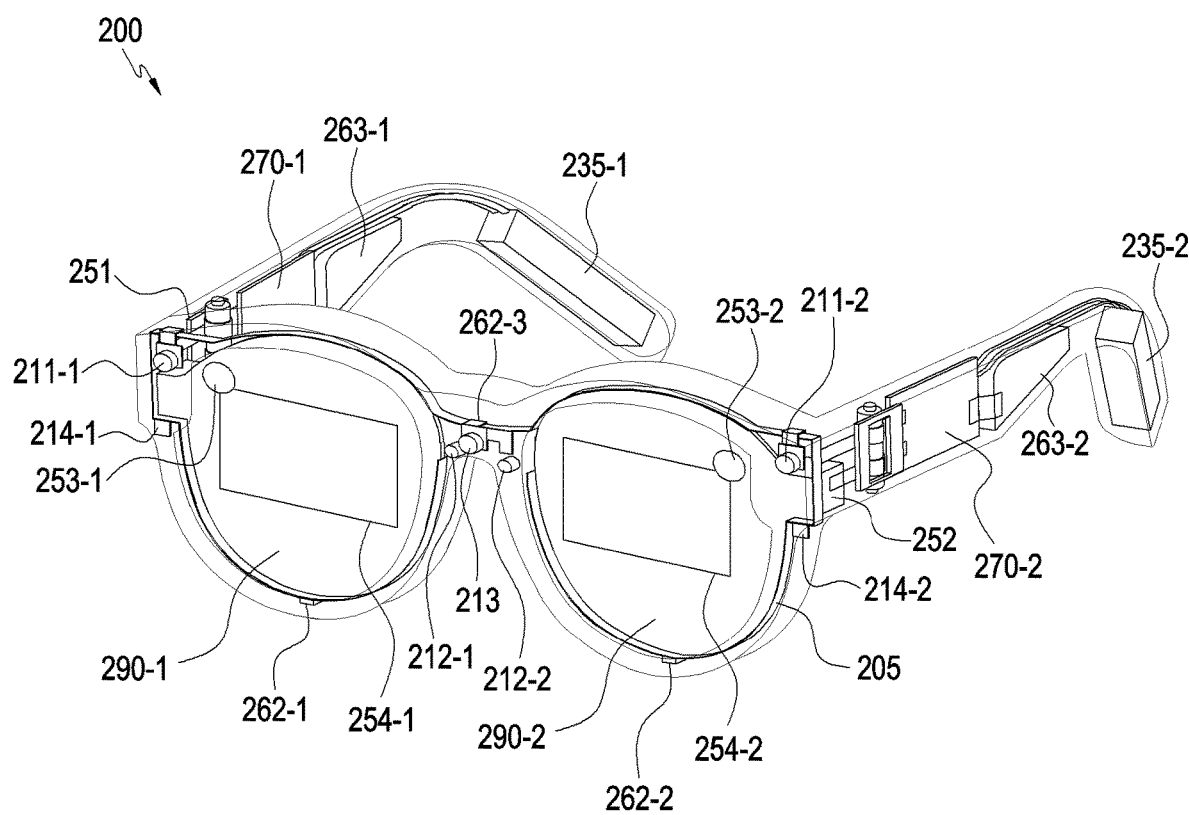
FIG. 2 illustrates a structure of an augmented reality device according to various embodiments.

FIG. 2 illustrates a structure of an augmented reality device according to various embodiments. According to various embodiments, an augmented reality device 200 may include one or more first cameras 211-1 and 211-2, one or more second cameras 212-1 and 212-2, and one or more third cameras 213. According to various embodiments, an image obtained through the one or more first cameras 211-1 and 211-2 may be used for detection of the user's hand gesture, tracking the user's head, and/or spatial recognition. According to various embodiments, the one or more first cameras 211-1 and 211-2 may be a global shutter (GS) camera or a rolling shutter (RS) camera. According to various embodiments, the one or more first cameras 211-1 and 211-2 may perform a simultaneous localization and mapping (SLAM) operation through depth capture. According to various embodiments, the one or more first cameras 211-1 and 211-2 may perform spatial recognition for 3DoF and/or 6DoF.

According to various embodiments, an image obtained through the one or more second cameras 212-1 and 212-2 may be used to detect and track the user's pupil. According to various embodiments, the one or more second cameras 212-1 and 212-2 may be GS cameras. According to various embodiments, the one or more second cameras 212-1 and 212-2 may correspond to the left eye and the right eye, respectively, and the one or more second cameras 212-1 and 212-2 may have the same performance.

According to various embodiments, the one or more third cameras 213 may be high-resolution cameras. According to various embodiments, the one or more third cameras 213 may perform an auto-focusing (AF) function and an OIS function. According to various embodiments, the one or more third cameras 213 may be a GS camera or a rolling shutter (RS) camera. According to various embodiments, the one or more third cameras 213 may be color cameras.

According to various embodiments, the augmented reality device 200 may include one or more light emitting devices 214-1 and 214-2. The light emitting devices 214-1 and 214-2 are different from a light source, which is described below, for irradiating light to a screen output area of the display. According to various embodiments, the light emitting devices 214-1 and 214-2 may irradiate light to facilitate pupil detection in detecting and tracking the user's pupils through the one or more second cameras 212-1 and 212-2. According to various embodiments, each of the light emitting devices 214-1 and 214-2 may include an LED. According to various embodiments, the light emitting devices 214-1 and 214-2 may irradiate light in an infrared band. According to various embodiments, the light emitting devices 214-1 and 214-2 may be attached around the frame of the augmented reality device 200. According to various embodiments, the light emitting devices 214-1 and 214-2 may be positioned around the one or more first cameras 211-1 and 211-2 and may assist in gesture detection, head tracking, and spatial recognition by the one or more first cameras 211-1 and 211-2 when the augmented reality device 200 is used in a dark environment. According to various embodiments, the light emitting devices 214-1 and 214-2 may be positioned around the one or more third cameras 213 and may assist in obtaining images by the one or more third cameras 213 when the augmented reality device 200 is used in a dark environment.

According to various embodiments, the augmented reality device 200 may include batteries 235-1 and 235-2. The batteries 235-1 and 235-2 may store power for operating the remaining components of the augmented reality device 200.

According to various embodiments, the augmented reality device 200 may include a first display 251, a second display 252, one or more input optical members 253-1 and 253-2, one or more transparent members 290-1 and 290-2, and one or more screen display portions 254-1 and 254-2. According to various embodiments, the first display 251 and the second display 252 may include, e.g., a liquid crystal display (LCD), a digital mirror device (DMD), a liquid crystal on silicon (LCoS), or an organic light emitting diode (OLED), or a micro light emitting diode (micro LED). According to various embodiments, when the first display 251 and the second display 252 are formed of one of a liquid crystal display device, a digital mirror display device, or a silicon liquid crystal display device, the augmented reality device 200 may include a light source for irradiating light to a screen output area of the display. According to various embodiments, when the first display 251 and the second display 252 may generate light on their own, e.g., when formed of either organic light emitting diodes or micro LEDs, the augmented reality device 200 may provide a virtual image of good quality to the user even when a separate light source is not included.

According to various embodiments, the one or more transparent members 290-1 and 290-2 may be disposed to face the user's eyes when the user wears the augmented reality device 200. According to various embodiments, the one or more transparent members 290-1 and 290-2 may include at least one of a glass plate, a plastic plate, and a polymer. According to various embodiments, the user may view the outside world through the one or more transparent members 290-1 and 290-2 when the user wears the augmented reality device 200. According to various embodiments, the one or more input optical members 253-1 and 253-2 may guide the light generated by the first display 251 and the second display 252 to the user's eyes. According to various embodiments, images based on the light generated by the first display 251 and the second display 252 may be formed on one or more screen display portions 254-1 and 254-2 on the one or more transparent members 290-1 and 290-2, and the user may view the images formed on the one or more screen display portions 254-1 and 254-2.

According to various embodiments, the augmented reality device 200 may include one or more optical waveguides (not shown). The optical waveguide may transfer the light generated by the first display 251 and the second display 252 to the user's eyes. The augmented reality device 200 may include one optical waveguide corresponding to each of the left eye and the right eye. According to various embodiments, the optical waveguide may include at least one of glass, plastic, or polymer. According to various embodiments, the optical waveguide may include a nano-pattern formed inside or on one outer surface, e.g., a polygonal or curved grating structure. According to various embodiments, the optical waveguide may include a free-form type prism, and in this case, the optical waveguide may provide incident light to the user through a reflective mirror. According to various embodiments, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to various embodiments, the diffractive element may include input/output optical elements. According to various embodiments, the reflective element may include a member causing total reflection.

According to various embodiments, the augmented reality device 200 may include one or more audio input devices 262-1, 262-2, and 262-3 and one or more audio output devices 263-1 and 263-2.

According to various embodiments, the augmented reality device 200 may include a first PCB 270-1 and a second PCB 270-2. The first PCB 270-1 and the second PCB 270-2 may transfer electrical signals to components included in the augmented reality device 200, such as a first camera 211, a second camera 212, a third camera 213, a display module 250, an audio module 261, and a sensor 280 described below with reference to FIG. 2. According to various embodiments, the first PCB 270-1 and the second PCB 270-2 may be FPCBs. According to various embodiments, the first PCB 270-1 and the second PCB 270-2 each may include a first substrate, a second substrate, and an interposer disposed between the first substrate and the second substrate.

Figure 3:
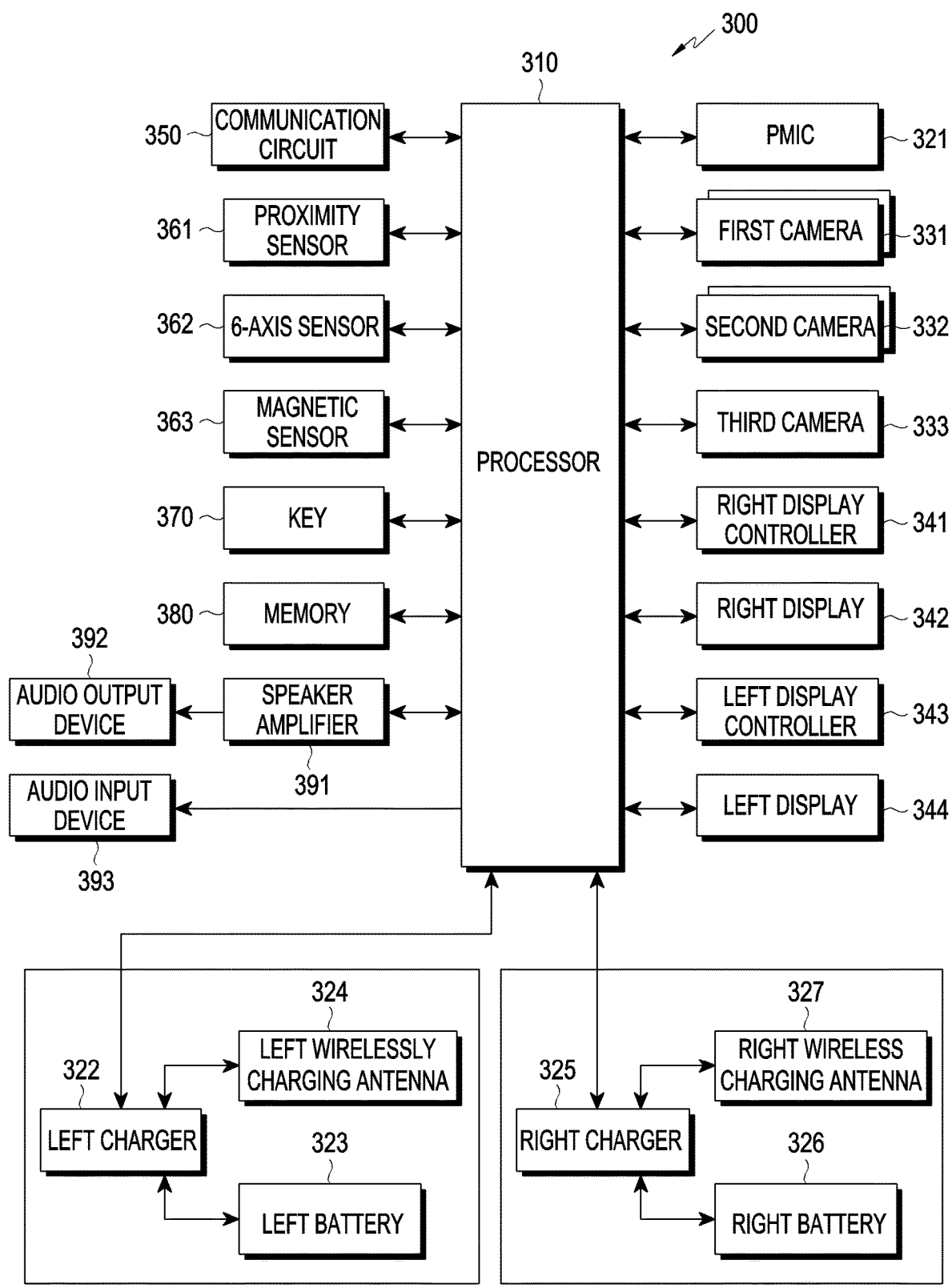
FIG. 3 is a block diagram illustrating an augmented reality device according to various embodiments.

FIG. 3 is a block diagram illustrating an augmented reality device according to various embodiments. An augmented reality device 300 may include a processor 310, a first camera 331, a second camera 332, a third camera 333, a PMIC 321, a left charger 322, a left wireless charging antenna 324, a left battery 323, a right charger 325, a right wireless charging antenna 327, a right battery 326, a right display controller 341, a right display 342, a left display controller 343, a left display 344, a communication circuit 350, a proximity sensor 361, a 6-axis sensor 362, a magnetic sensor 363, a key 370, a memory 380, a speaker amplifier 391, an audio output device 392, and an audio input device 393.

According to various embodiments, the processor 310 may control the other components of the augmented reality device 300, e.g., the first camera 331, the second camera 332, the third camera 333, the PMIC 321, the right display controller 341, the left display controller 343, the communication circuit 350, the memory 380, and the speaker amplifier 391 and may perform various data processing or computations.

According to various embodiments, the details of the one or more first cameras 211-1 and 211-2, one or more second cameras 212-1 and 212-2, and one or more third cameras 213 described above in connection with FIG. 2 may be equally applied to the first camera 331, the second camera 332, and the third camera 333, respectively. According to various embodiments, the augmented reality device 300 may include at least one of the first camera 331, the second camera 332, and the third camera 333, in plurality.

According to various embodiments, the PMIC 321 may convert the power stored in the left battery 323 and the right battery 326 to have the current or voltage required by the other components of the augmented reality device 300 and supply it to the other components of the augmented reality device 300. According to various embodiments, the right battery 326 may be implemented as the battery 235-1 of FIG. 2, and the left battery 323 may be implemented as the battery 235-2 of FIG. 2. According to various embodiments, the left charger 322 may charge the left battery 323 based on the wireless power received through the left wireless charging antenna 324. According to various embodiments, the right charger 325 may charge the right battery 326 based on the wireless power received through the right wireless charging antenna 327.

According to various embodiments, the right display controller 341 and the right display 342 may configure the first display 251 described above with reference to FIG. 2. According to various embodiments, the right display controller 341 may control a driver of the right display 342. According to various embodiments, the right display 342 may display a screen by transferring a light source. According to various embodiments, the left display controller 343 and the left display 344 may configure the second display 252 described above with reference to FIG. 2. According to various embodiments, the left display controller 343 may control a driver of the left display 344. According to various embodiments, the left display 344 may display a screen by transferring a light source.

According to various embodiments, the communication circuit 350 may support establishment of a wireless communication channel with an electronic device outside the augmented reality device 300 and performing communication through the established communication channel.

According to various embodiments, the augmented reality device 300 may further include other various types of sensors than the proximity sensor 361, the 6-axis sensor 362, and the magnetic sensor 363.

According to various embodiments, the memory 380 may store various data used by at least one component (e.g., the processor 310) of the augmented reality device 300.

According to various embodiments, the speaker amplifier 391 may be connected with the audio output device 392 to generate data to be transferred to the audio output device 392. According to various embodiments, the audio output device 392 may include a speaker.

Figure 4:
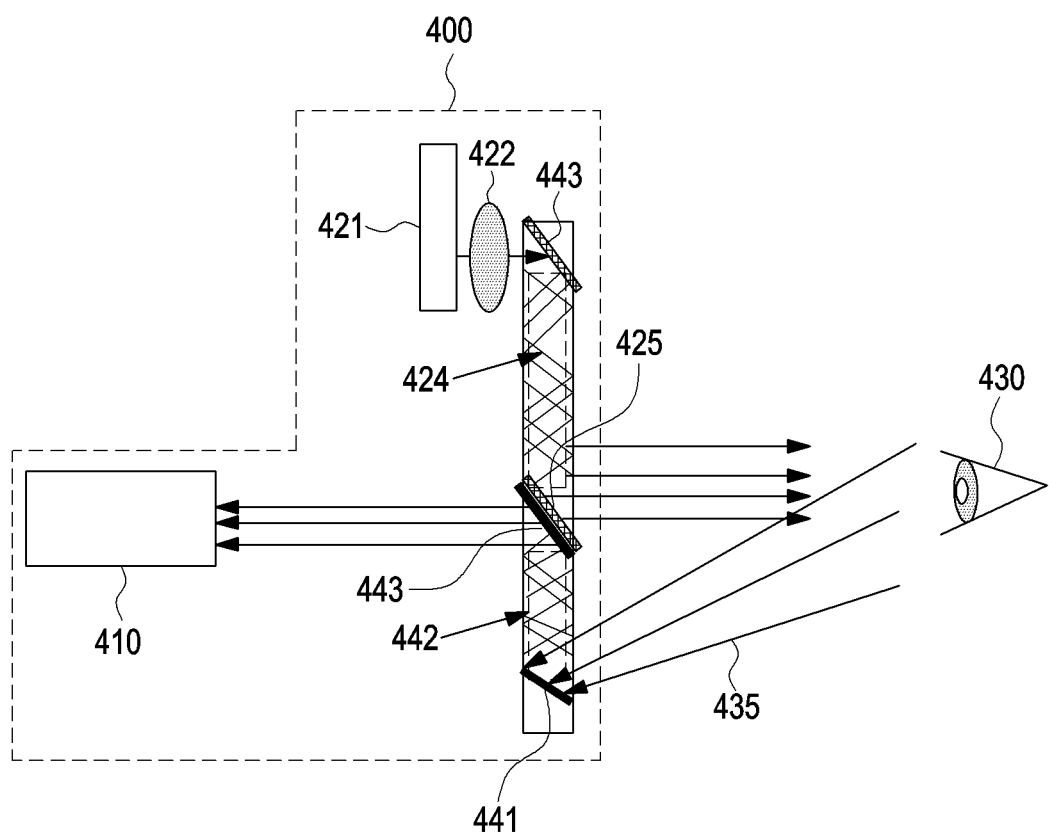
FIG. 4 illustrates a structure of a display and an eye tracking camera of an augmented reality device according to various embodiments.

FIG. 4 illustrates a structure of a display and an eye tracking camera of an augmented reality device according to various embodiments. An augmented reality device 400 (e.g., the augmented reality device 400 of FIG. 2) may include a display 421, a projection lens 422, an input optical member 423, a display optical waveguide 424, an output optical member 425, an eye tracking camera 410, a first splitter 441, an eye tracking optical waveguide 442, and/or a second splitter 443.

In the augmented reality device 400, the display 421 may be the first display 251 or the second display 252 illustrated in FIG. 2. The light output from the display 421 may be refracted by the projection lens 422 and converge into a smaller aperture area. The light refracted by the projection lens 422 may pass through the input optical member 423 (e.g., the input optical members 253-1 and 253-2 of FIG. 2) and be incident on the display optical waveguide 424, and then may pass through the display optical waveguide 424 and be output through the output optical member 425. The light output from the output optical member 425 may be seen by the user's eyes 430. Hereinafter, in the disclosure, the expression "displays an object on the display" may mean that light output from the display 421 may be output through the output optical member 425, and the shape of the object is seen by the user's eyes 430 by the light output through the output optical member 425. Further, the expression "controls the display to display the object" may mean that the light output from the display 421 may be output through the output optical member 425, and the display 421 is controlled so that the shape of the object is seen by the user's eyes 430 by the light output through the output optical member 425.

The light 435 reflected from the user's eye 430 may pass through the first splitter 441 and be incident on the eye tracking optical waveguide 442, and may then pass through the eye tracking optical waveguide 442 and be output to the eye tracking camera 410 through the second splitter 443. According to various embodiments, the light 435 reflected from the user's eye 430 may be light output from the light emitting devices 214-1 and 214-2 of FIG. 1 and reflected from the user's eye 430. According to various embodiments, the eye tracking camera 410 may be one or more second cameras 212-1 and 212-2 illustrated in FIG. 2.

Figure 5:
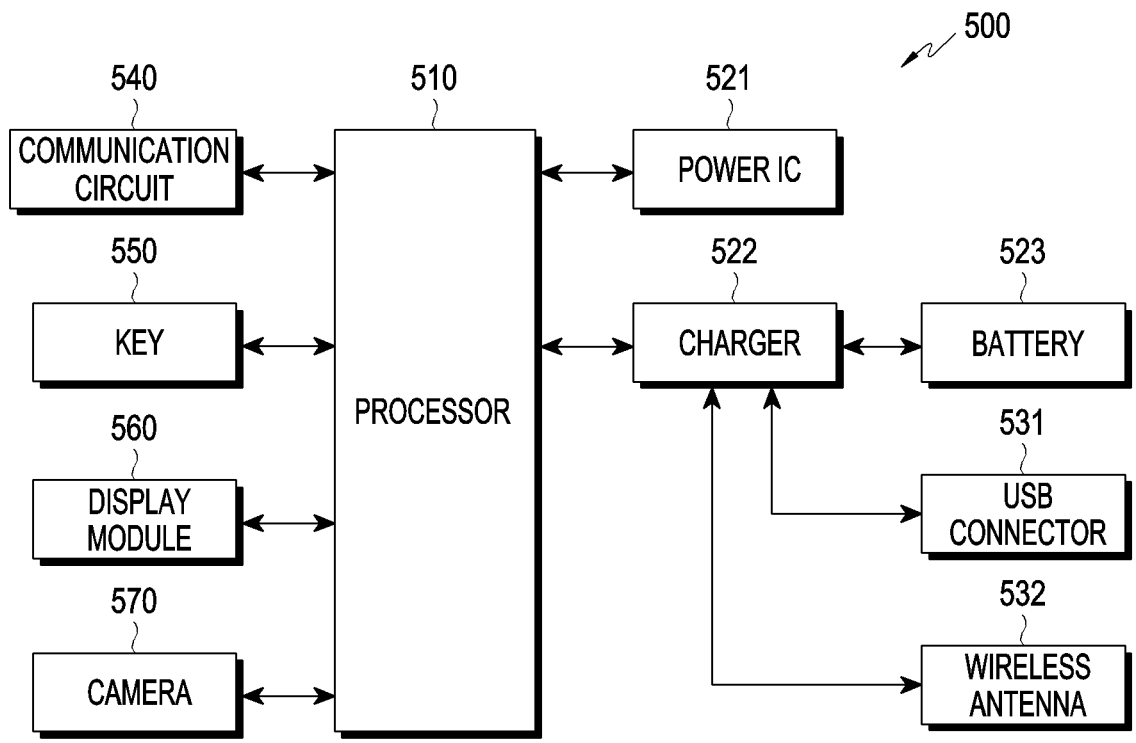
FIG. 5 is a block diagram illustrating a case capable of receiving an augmented reality device according to various embodiments.

FIG. 5 is a block diagram illustrating a case capable of receiving an augmented reality device according to various embodiments. According to various embodiments, an augmented reality device (e.g., the augmented reality device 200 of FIG. 2) may be received inside a case 500. According to various embodiments, the case 500 may include a processor 510, a power IC 521, a charger 522, a battery 523, a USB connector 531, a wireless antenna 532, a communication circuit 540, and a key 550, a display module 560, and a camera 570.

According to various embodiments, the processor 510 may control the other components of the case 500, e.g., the power IC 521, the charger 522, the communication circuit 540, the key 550, the display module 560, and the camera 570, and may perform various data processing or computations.

According to various embodiments, the power IC 521 may convert the power stored in the battery 523 to have the current or voltage required by the other components of the case 500 and may supply it to the other components of the case 500.

According to various embodiments, the charger 522 may charge the battery 523 based on the wireless power received through the wireless antenna 532 and/or an external power source connected through the USB connector 531. According to various embodiments, the USB connector 531 may connect the case 500 with the external power source and/or another electronic device. According to various embodiments, the augmented reality device 200 received inside the case 500 and the case 500 may be electrically connected through the USB connector 531.

According to various embodiments, the communication circuit 540 may support establishment of a wireless communication channel with another electronic device outside the case 500 and performing communication through the established communication channel.

According to various embodiments, the display module 560 may include a touch sensor. The display module 560 is not limited to a specific structure.

Figure 6:
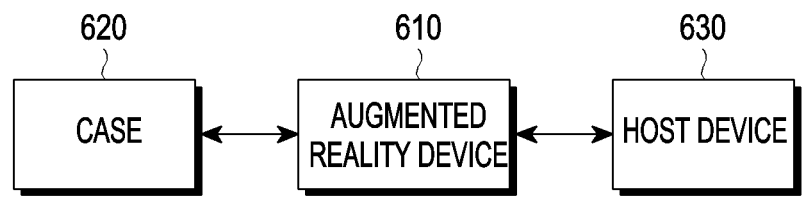
FIG. 6 illustrates connections between an augmented reality device and other devices according to various embodiments.

FIG. 6 illustrates connections between an augmented reality device and other devices according to various embodiments. According to various embodiments, an augmented reality device 610 (e.g., the augmented reality device 200 of FIG. 2) may communicate with a case 620 (e.g., the case 500 of FIG. 5) and a host device 630 (e.g., the electronic device 101 of FIG. 1). According to various embodiments, the augmented reality device 610 may be received inside the case 620.

According to various embodiments, the case 620 may charge the augmented reality device 610 when connected with the augmented reality device 610. According to various embodiments, the case 620 may function as an auxiliary computing device that performs at least some of the computations that may be performed on the augmented reality device 610 while communicating with the augmented reality device 610. According to various embodiments, the case 620 may function as an auxiliary computing device performing at least some of the computations that may be performed by the host device 630, by communicating with the augmented reality device 610 communicating with the host device 630.

According to various embodiments, the augmented reality device 610 may communicate with the host device 630, receive information from the host device 630, and perform an operation based on the received information.

According to various embodiments, the host device 630 may be a device including a main processor like the electronic device 101 of FIG. 1 or may be a network and/or cloud (or server).

Figure 7:
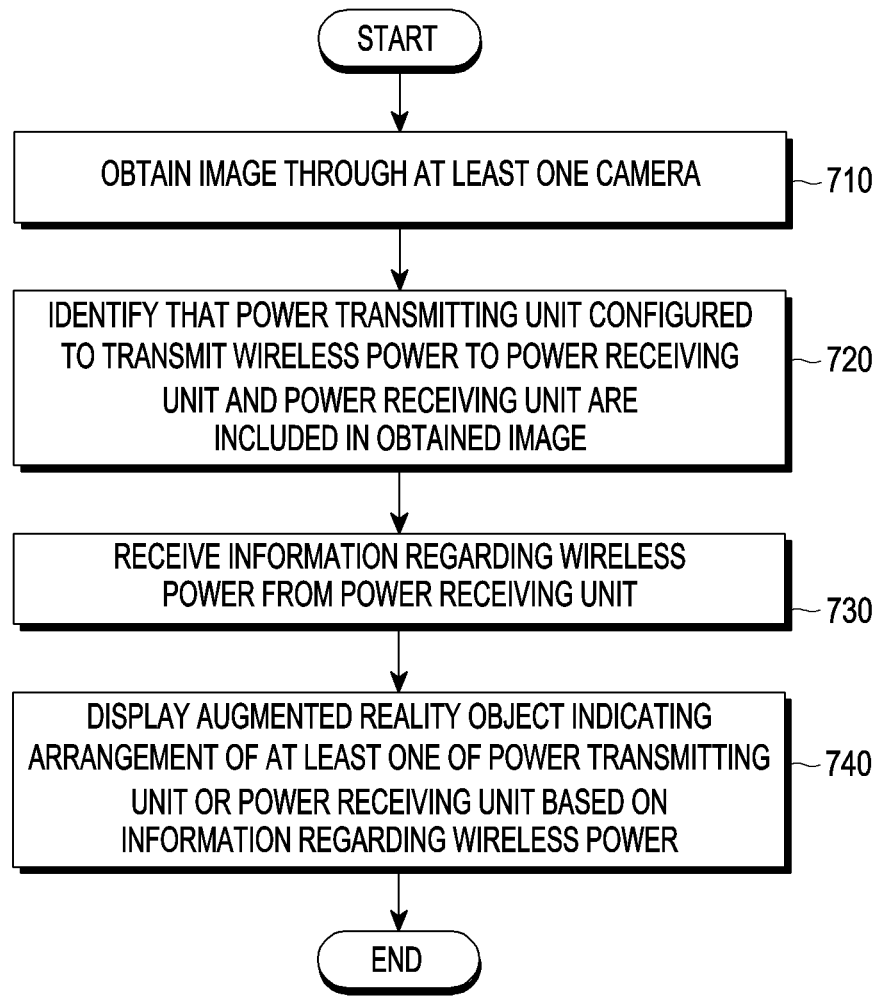
FIG. 7 is a flowchart illustrating operations performed in an augmented reality device according to various embodiments.

FIG. 7 is a flowchart illustrating operations performed in an augmented reality device according to various embodiments. Although a description is made below with reference to the components of the augmented reality device 300 of FIG. 3, according to various embodiments, the augmented reality device performing the operations of FIG. 7 is not limited to the augmented reality device 300 of FIG. 3, and the operations of FIG. 7 may also be performed by the host device (e.g., the electronic device 101 of FIG. 1) of FIG. 6.

In operation 710, at least one processor 310 of the augmented reality device 300 may obtain an image through at least one camera (e.g., at least one of the first camera 331 or the third camera 333).

In operation 720, the at least one processor 310 of the augmented reality device 300 may identify that the obtained image includes a wireless power transmitter configured to transmit wireless power to a wireless power receiver and the wireless power receiver. According to various embodiments, the at least one processor 310 of the augmented reality device 300 may detect the shape of the wireless power transmitter and the wireless power receiver in the image by analyzing the obtained image. In this case, the at least one processor 310 may detect the shape of the wireless power transmitter and the wireless power receiver in the image by referring to information regarding the shape of the wireless power transmitter and the wireless power receiver, stored in the memory of the augmented reality device 300.

According to various embodiments, the at least one processor 310 of the augmented reality device 300 may transmit the obtained image to an external electronic device (e.g., a server) through the communication circuit 350 and, by receiving the result of analysis of the obtained image from the external electronic device, identify that the wireless power transmitter and the wireless power receiver are included in the image.

According to various embodiments, the wireless power receiver may be the host device 630 of FIG. 6 (e.g., the electronic device 101 of FIG. 1). Further, the wireless power receiver may further include devices for wirelessly receiving power from the wireless power transmitter. For example, the devices may include a resonance circuit (e.g., at least one coil and an electrical component (e.g., a capacitor or an inductor) connected to the at least one coil), a wireless power receiving circuit including a rectifier, a DC/DC converter, and a charger, an impedance matching circuit, and a detection circuit for detecting the rectifier output voltage Vrect and/or the rectifier output current Irect. Since the wireless power receiver may be implemented in a scheme defined in the alliance for wireless power (A4WP) standard (or air fuel alliance (AFA) standard), a detailed description thereof will be omitted. Meanwhile, without being limited to what is described, the wireless power receiver may be implemented in a scheme defined in a wireless power consortium (WPC) standard (or Qi standard) to transmit power according to an induction scheme or to transmit power according to an electromagnetic wave scheme, and since it is a well-known technique, a detailed description thereof is omitted.

According to various embodiments, the wireless power transmitter may wirelessly transmit power according to a resonance scheme. In the case of a resonance scheme, the wireless power transmitter may include, e.g., a power source, a DC-AC conversion circuit (or an amplifying circuit), an impedance matching circuit, at least one capacitor, at least one coil, and an out-band communication circuit (e.g., a Bluetooth low energy (BLE) communication circuit) but, without being limited thereto, may be implemented to include more components (e.g., the components of the electronic device 101 of FIG. 1). The at least one capacitor and the at least one coil may constitute a resonance circuit. The wireless power transmitter may be implemented in a scheme defined in, e.g., the A4WP standard (or AFA standard), and thus, a detailed description is omitted. Meanwhile, without being limited to what is described, the wireless power transmitter may be implemented in a scheme defined in a WPC standard (or Qi standard) to transmit power according to an induction scheme or to transmit power according to an electromagnetic wave scheme, and since it is a well-known technique, a detailed description thereof is omitted.

In operation 730, at least one processor 310 of the augmented reality device 300 may receive information regarding wireless power from the wireless power receiver through the communication circuit 350. According to various embodiments, the information regarding wireless power may indicate a charging current supplied to the battery of the wireless power receiver by wireless power. According to various embodiments, the information regarding wireless power may indicate at least one of the voltage of the battery of the wireless power receiver, the temperature of the battery, or information for charging efficiency. The charging efficiency may indicate the hourly charging amount of the battery of the wireless power receiver and/or may indicate the rectifier output power of the wireless power receiver as compared to the output power of the wireless power transmitter.

In operation 740, the at least one processor 310 of the augmented reality device 300 may display an augmented reality object indicating an arrangement of at least one of the wireless power transmitter or the wireless power receiver based on the information regarding wireless power on the display (e.g., the right display 342 and/or the left display 344). According to various embodiments, the at least one processor 310 of the augmented reality device 300 may receive information regarding the target value of the charging current from the wireless power receiver and may identify whether the actual charging current is sufficiently close to the target value of the charging current based on the information regarding the power received from the wireless power receiver in operation 730. According to various embodiments, the at least one processor 310 of the augmented reality device 300 may identify a value obtained by multiplying the target value of the charging current by a predetermined ratio, as a threshold, and in operation 730, display, on the displays 342 and 344, a first augmented reality object indicating that movement of the wireless power transmitter and the wireless power receiver is not necessary when the actual charging current indicated by the information regarding the power received from the wireless power receiver in operation 730 is equal to or larger than the threshold.

According to various embodiments, when the actual charging current indicated by the information regarding the power received from the wireless power receiver in operation 730 is less than the threshold, the at least one processor 730 of the augmented reality device 300 may display, on the displays 342 and 344, the first augmented reality object indicating to move at least one of the wireless power transmitter or the wireless power receiver. Examples of the view shown to the user when the first augmented reality object is displayed on the displays 342 and 344 are illustrated in FIGS. 9A to 9C and 11A and 11B.

FIGS. 9A to 9C, 11A, and 11B illustrate exemplary views shown to the user through an augmented reality device according to various embodiments. In FIGS. 9A to 9C, 10A, 10B, 11A, and 11B, the object (or figure) shown in a solid line pattern denotes the actual object, and the object (or figure or text) indicated by a shading or reference number other than the solid line pattern denotes the augmented reality object.

Figure 9A:
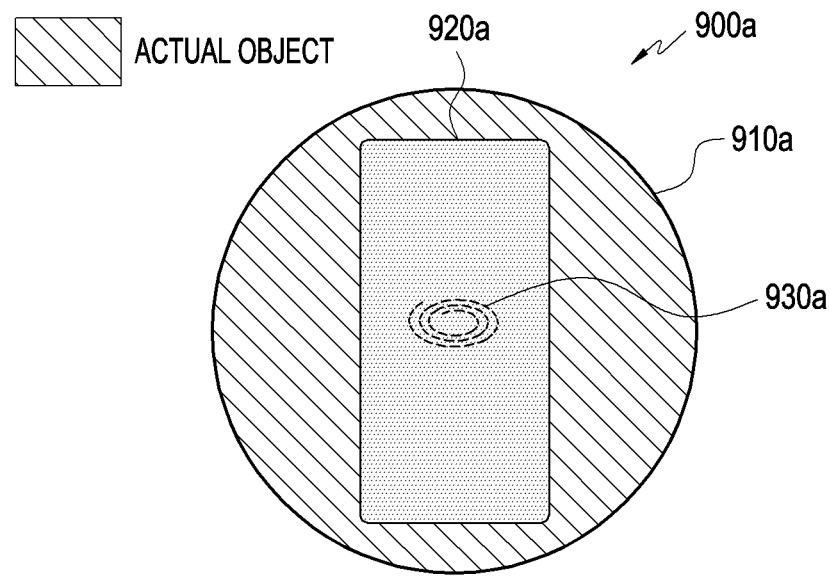
FIG. 9A illustrates an example view shown to a user through an augmented reality device according to various embodiments.
Figure 9B:
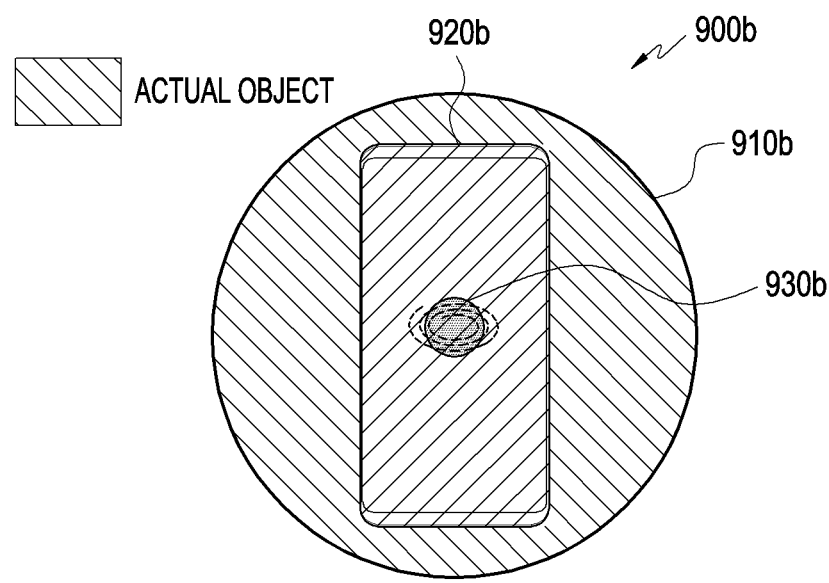
FIG. 9B illustrates an example view shown to a user through an augmented reality device according to various embodiments.
Figure 9C:
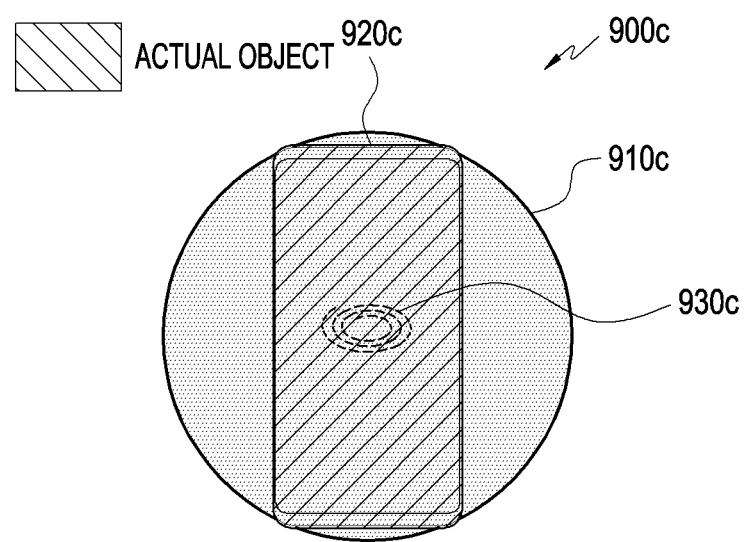
FIG. 9C illustrates an example view shown to a user through an augmented reality device according to various embodiments.

According to various embodiments, the augmented reality device 300 may display an augmented reality object associated with at least one of the wireless power transmitter or the wireless power receiver. Referring to FIGS. 9A to 9C, the user may place the wireless power receiver according to the displayed augmented reality object.

Referring to FIG. 9A, the wireless power transmitter 910a which is the actual object may be included in the exemplary view 900a, and the first augmented reality object 920a may indicate a preferable position of the wireless power receiver. Further, the first augmented reality object 930a may instruct the user to place the wireless power receiver in the position where charging may be efficiently performed if the user is aware of the position of the coil in the wireless power receiver, by indicating the position of the coil of the wireless power transmitter 910a.

Referring to FIG. 9B, the wireless power transmitter 910b and the wireless power receiver 920b that are actual objects may be included in the exemplary view 900b, and the first augmented reality object 930b may indicate a central position (or the position of the center) of the wireless power transmitter 910b, as a preferred position of the wireless power receiver 920b.

Referring to FIG. 9C, the wireless power receiver 920c which is the actual object may be included in the exemplary view 900c, and the first augmented reality object 910c may indicate a preferable position of the wireless power transmitter. Further, the first augmented reality object 930c may instruct the user to place the wireless power receiver in the position where charging may be efficiently performed if the user is aware of the position of the coil in the wireless power transmitter, by indicating the position of the coil of the wireless power receiver 920c.

According to various embodiments, the augmented reality device 300 may display an augmented reality object for guiding to the position of the wireless power receiver based on information associated with charging. For example, the information associated with charging may include information regarding charging efficiency and/or information regarding a charging state that is identified based on information associated with wireless power.

Figure 11A:
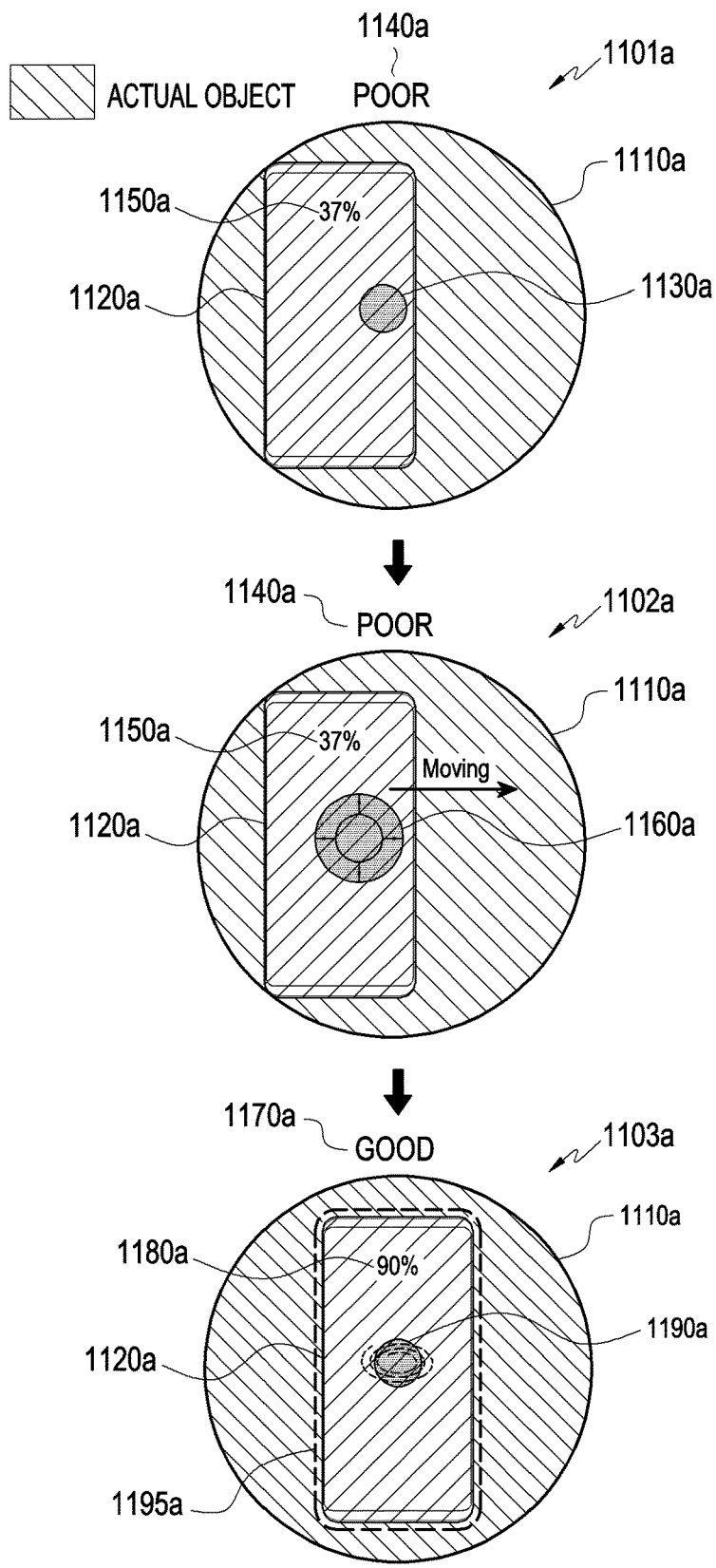
FIG. 11A illustrates an example view shown to a user through an augmented reality device according to various embodiments.
Figure 11B:
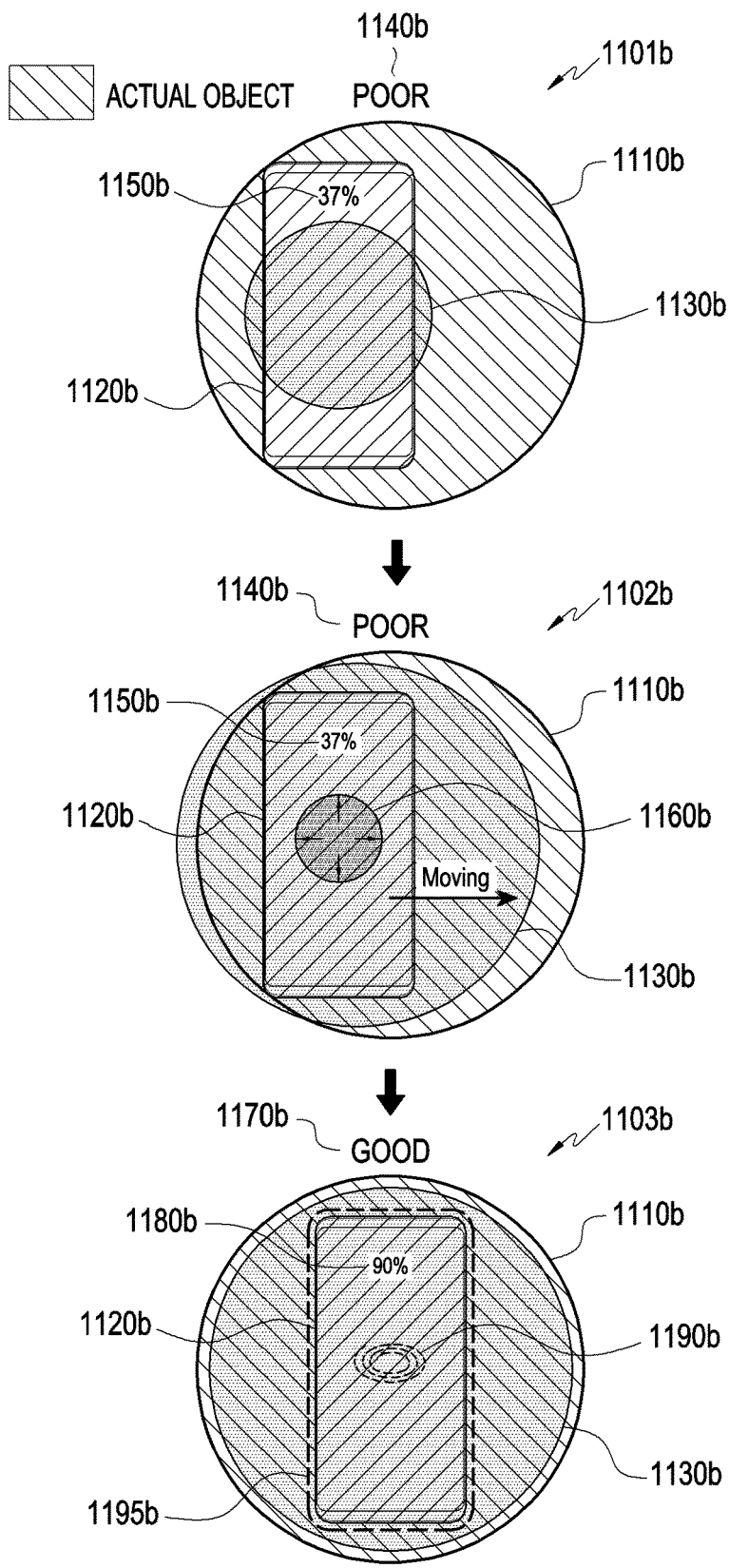
FIG. 11B illustrates an example view shown to a user through an augmented reality device according to various embodiments.

Referring to FIGS. 11A and 11B, the augmented reality device 300 may display an augmented reality object for guiding to the position of the wireless power receiver 1120a or 1120b to increase the charging efficiency of the wireless power receiver 1120a or 1120b and an augmented reality object indicating information associated with the charging efficiency (e.g., the augmented reality objects 1130a, 1140a, 1150a, 1160a, 1170a, 1180a, 1170a, and 1180a of FIG. 11A and the augmented reality objects 1130b, 1140b, 1150b, 1160b, 1170b, and 1180b of FIG. 11B).

For example, referring to FIG. 11A, a wireless power transmitter 1110a and a wireless power receiver 1120a may be included in the exemplary views 1101a, 1102a, and 1103a, and a first augmented reality object 1130a indicating the central position of the wireless power transmitter 1110a, a second augmented reality object 1160a for guiding to the position of the wireless power receiver 1120a, and augmented reality objects 1140a, 1150a, 1170a, and 1180a indicating the charging status and/or the charging efficiency may be displayed by the augmented reality device 300.

For example, referring to 1101a of FIG. 11A, when the wireless power receiver 1120a is disposed on the wireless power transmitter 1110a, the augmented reality device 300 may display the first augmented reality object 1130a indicating the central position (or the position of the center) of the wireless power transmitter 1110a based on the analysis (e.g., the operation described in FIG. 10A) of an image captured for the wireless power transmitter 1110a and may display the third augmented reality object 1140a indicating the charging status (e.g., poor) and the fourth augmented reality object 1150a indicating the charging efficiency (e.g., 37%). The augmented reality device 300 may compare the charging efficiency with a preset threshold and, if the charging efficiency is less than the threshold (e.g., 90%), identify that the charging status is an abnormal status (e.g., poor) while identifying that the charging status is a normal status (e.g., good) if the charging efficiency is not less than the charging efficiency. However, without being limited thereto, the augmented reality device 300 may identify more charging statuses.

Referring to 1102a of FIG. 11A, when the charging status is an abnormal status, the augmented reality device 300 may display the second augmented reality object 1160a for guiding to the position of the wireless power receiver 1120a. The user may identify display of the third augmented reality object 1140a indicating the charging status (e.g., poor), the fourth augmented reality object 1150a indicating the charging efficiency (e.g., 37%), and/or the second augmented reality object 1160a and may accordingly move the position of the wireless power receiver 1120a in some directions of a plurality of directions (e.g., upper, lower, left, and/or right direction when viewed from above). In an embodiment, the second augmented reality object 1160a may include an indicator (e.g., an arrow) indicating a specific direction (e.g., a right direction) in which the charging efficiency is expected to increase among the plurality of directions (e.g., upper, lower, left, and/or right direction), but is not limited thereto. For example, the augmented reality device 300 may identify the charging efficiency that is changed as the wireless power receiver 1120a is moved in a specific direction by the user and, when the changed charging efficiency is higher than the charging efficiency before change, identify that the specific direction is the direction in which the charging efficiency is expected to increase.

When the wireless power receiver 1120a is moved by the user, referring to 1103a of FIG. 11A, the augmented reality device 300 may display a fifth augmented reality object 1170a indicating the changed charging status (e.g., good) according to the movement and a sixth augmented reality object 1180a indicating the changed charging efficiency (e.g., 90%). Without being limited to those shown, the charging status and/or the charging efficiency may remain unchanged even when the wireless power receiver 1120a is moved and, in such a case, the display of the augmented reality objects 1140a and 1150a may be maintained.

At this time, if the changed charging status is the normal status and/or if the changed charging efficiency is a threshold (e.g., 90%) or more, the augmented reality device 300 may store (and/or register) information for the view including the position of the wireless power receiver 1120a and/or the augmented reality objects 1190a and 1195a (or images) associated with the position of the wireless power receiver 1120a. The information for the view may include information for the augmented reality objects 1180a and 1190a (or images) and information for the positions where the augmented reality objects 1190a and 1195a (or images) are to be displayed. The information for the view may be stored to be associated with the information for the wireless power transmitter 1110a and the wireless power receiver 1120a (e.g., store to be associated with the shape of each unit or to be associated with the position of each unit). As is described below, the augmented reality device 300 may use the stored information (e.g., positions and images), as information for guiding the wireless power receiver 1120a at a later time.

The images for the augmented reality objects 1190a and 1195a may include an augmented reality object 1190a indicating the position of the coil of the wireless power transmitter 1110a (and/or the coil of the wireless power receiver 1120a) and/or an augmented reality object 1195a indicating the position of the wireless power receiver 1120a. The augmented reality object 1195a indicating the position of the wireless power receiver 1120a may be implemented as an object (e.g., a dotted line or solid line) corresponding to the contour of the wireless power receiver 1120a, an object having a shape corresponding to the wireless power receiver 1120a, and/or other various types of objects that may indicate the position of the wireless power receiver 1120a. The augmented reality device 300 may further include information associated with the wireless power receiver in the corresponding position (e.g., information for a sensor (e.g., an acceleration sensor or geomagnetic sensor) of the wireless power receiver 1120a (e.g., the host device 630 of FIG. 6)), together with the position and/or the image.

For example, referring to FIG. 11B, in the exemplary views 1101b, 1102b, and 1103b, a wireless power transmitter 1110b and a wireless power receiver 1120b may be included, and a first augmented reality object 1130b having a circular shape with a center point corresponding to the central position (or position of center) of the wireless power receiver 1120b, a second augmented reality object 1160b for guiding to the position of the wireless power receiver 1120b, and augmented reality objects 1140b, 1150b, 1170b, and 1180b indicating the charging status and/or the charging efficiency may be displayed by the augmented reality device 300.

For example, referring to 1101b of FIG. 11B, when the wireless power receiver 1120b is disposed on the wireless power transmitter 1110b, the augmented reality device 300 may display the circular first augmented reality object 1130b having the center point corresponding to the central position (or the position of the center) of the wireless power receiver 1120b based on the analysis (e.g., the operation described in FIG. 10b) of an image captured for the wireless power transmitter 1110b and may display the third augmented reality object 1140b indicating the charging status (e.g., poor) and the fourth augmented reality object 1150b indicating the charging efficiency (e.g., 37%).

As described above, the augmented reality device 300 may compare the charging efficiency with a preset threshold and identify the charging status. Referring to 1102b of FIG. 11B, when the charging status is the abnormal status, the augmented reality device 300 may enlarge and display the second augmented reality object 1160b for guiding to the position of the wireless power receiver 1120b and the circular first augmented reality object 1130b. A portion of the enlarged first augmented reality object 1130b may not be positioned on the wireless power transmitter 1110b. The user may identify the third augmented reality object 1140b indicating the charging status (e.g., poor), the fourth augmented reality object 1150b indicating the charging efficiency (e.g., 37%), and the second augmented reality object 1160b, and/or that a portion of the first augmented reality object 1130b is not positioned on the wireless power transmitter 1110b and may accordingly move the position of the wireless power receiver 1120b in some directions of a plurality of directions (e.g., upper, lower, left, and/or right direction when viewed from above).

As described above, the second augmented reality object 1160b may include an indicator (e.g., an arrow) indicating a specific direction (e.g., right direction) in which the charging efficiency is expected to increase. When the wireless power receiver 1120b is moved by the user, referring to 1103b of FIG. 11B, the augmented reality device 300 may display a fifth augmented reality object 1170b indicating the changed charging status (e.g., good) according to the movement and a sixth augmented reality object 1180b indicating the changed charging efficiency (e.g., 90%). In this case, as the central position (or position of center) of the wireless power receiver 1120b moves, the enlarged first augmented reality object 1130b is also moved and, resultantly, when the charging status is good (or normal status) or the charging efficiency is the threshold or more, the moved first augmented reality object 1130b may be positioned on the wireless power receiver 1120b. At this time, based on the changed charging status being the normal status and/or the changed charging efficiency being the threshold (e.g., 90%) or more, the augmented reality device 300 may store (and/or register) information for the view including the position of the wireless power receiver 1120b and/or the augmented reality objects 1190b and 1195b (or images) associated with the position of the wireless power receiver 1120b.

As is described below, the augmented reality device 300 may use the stored information (e.g., positions and images), as information for guiding the wireless power receiver 1120b at a later time. The images for the augmented reality objects 1190b and 1195b may include an augmented reality object 1190b indicating the coil of the wireless power receiver 1120b and/or an augmented reality object 1195b finally positioned (i.e., shown in 1103b of FIG. 11B). The augmented reality object 1195b indicating the position of the wireless power receiver 1120b may be implemented as an object (e.g., a dotted line or solid line) corresponding to the contour of the wireless power receiver 1120b, an object having a shape corresponding to the wireless power receiver 1120b, and/or other various types of objects that may indicate the position of the wireless power receiver 1120b. The augmented reality device 300 may further include information associated with the wireless power receiver in the corresponding position (e.g., information for a sensor (e.g., an acceleration sensor or geomagnetic sensor) of the wireless power receiver 1120b (e.g., the host device 630 of FIG. 6)), together with the position and/or the image.

According to various embodiments, upon performing operation 740, at least one processor 310 of the augmented reality device 300 may further display an additional augmented reality object based on at least one of the voltage or temperature of the battery of the wireless power receiver.

According to various embodiments, when the voltage of the battery of the wireless power receiver is less than a threshold voltage, the at least one processor 310 may further display an additional augmented reality object indicating that charging is needed. According to various embodiments, when the voltage of the battery of the wireless power receiver is the threshold voltage or more, the at least one processor 310 may further display an additional augmented reality object indicating that charging has been completed. According to various embodiments, when the temperature of the battery of the wireless power receiver is the threshold or more, the at least one processor 310 may further display an additional augmented reality object indicating to terminate at least some of the functions running on the wireless power receiver or to separate the wireless power receiver from the wireless power transmitter to be able to reduce the temperature of the battery. According to an embodiment, when the temperature of the battery of the wireless power receiver is the threshold temperature or more, the at least one processor 310 may transmit a wireless charging stop request to the wireless power receiver through the communication circuit 350.

Figure 8A:
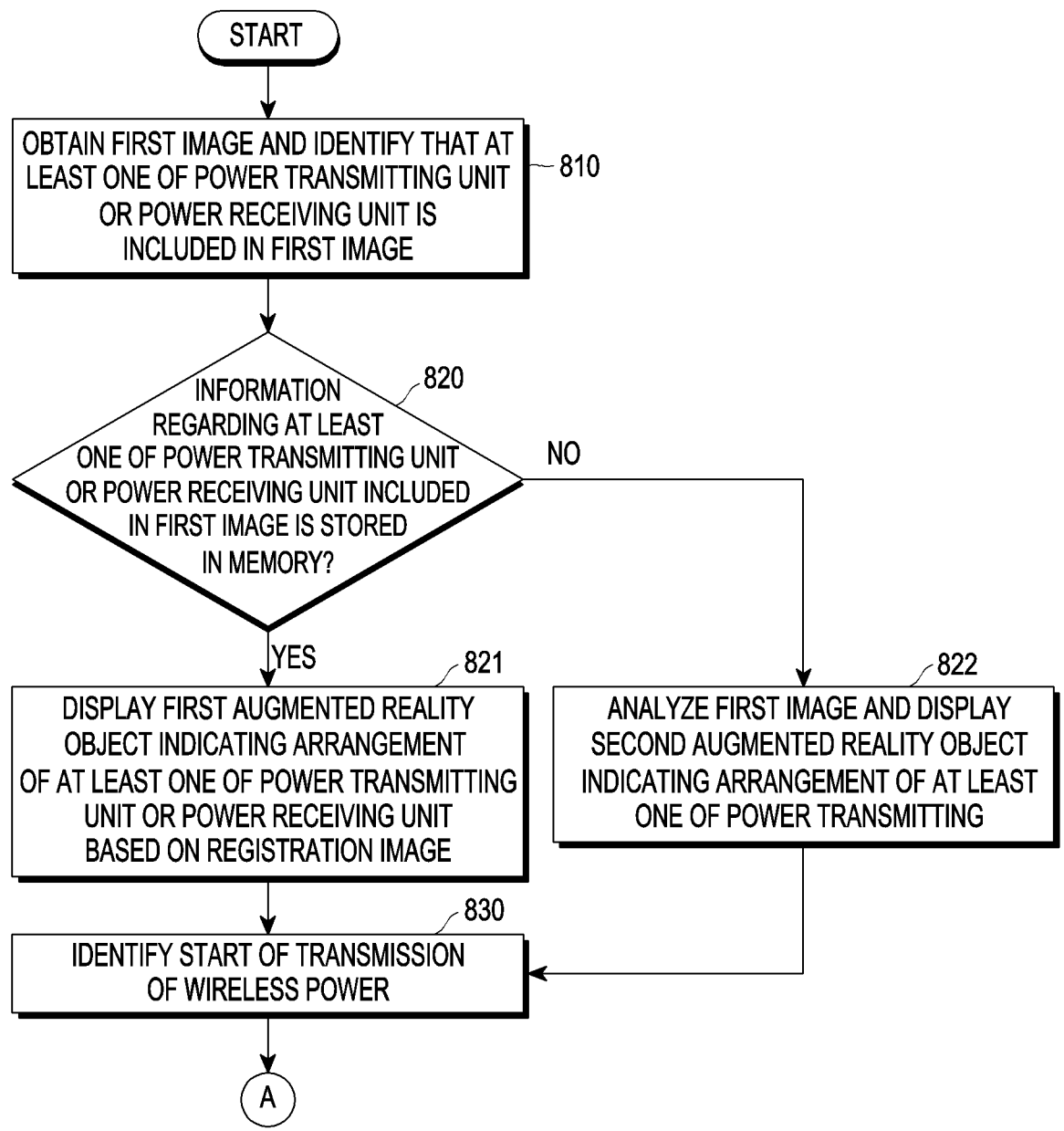
FIGS. 8A and 8B are flowcharts illustrating operations performed in an augmented reality device according to various embodiments.
Figure 8B:
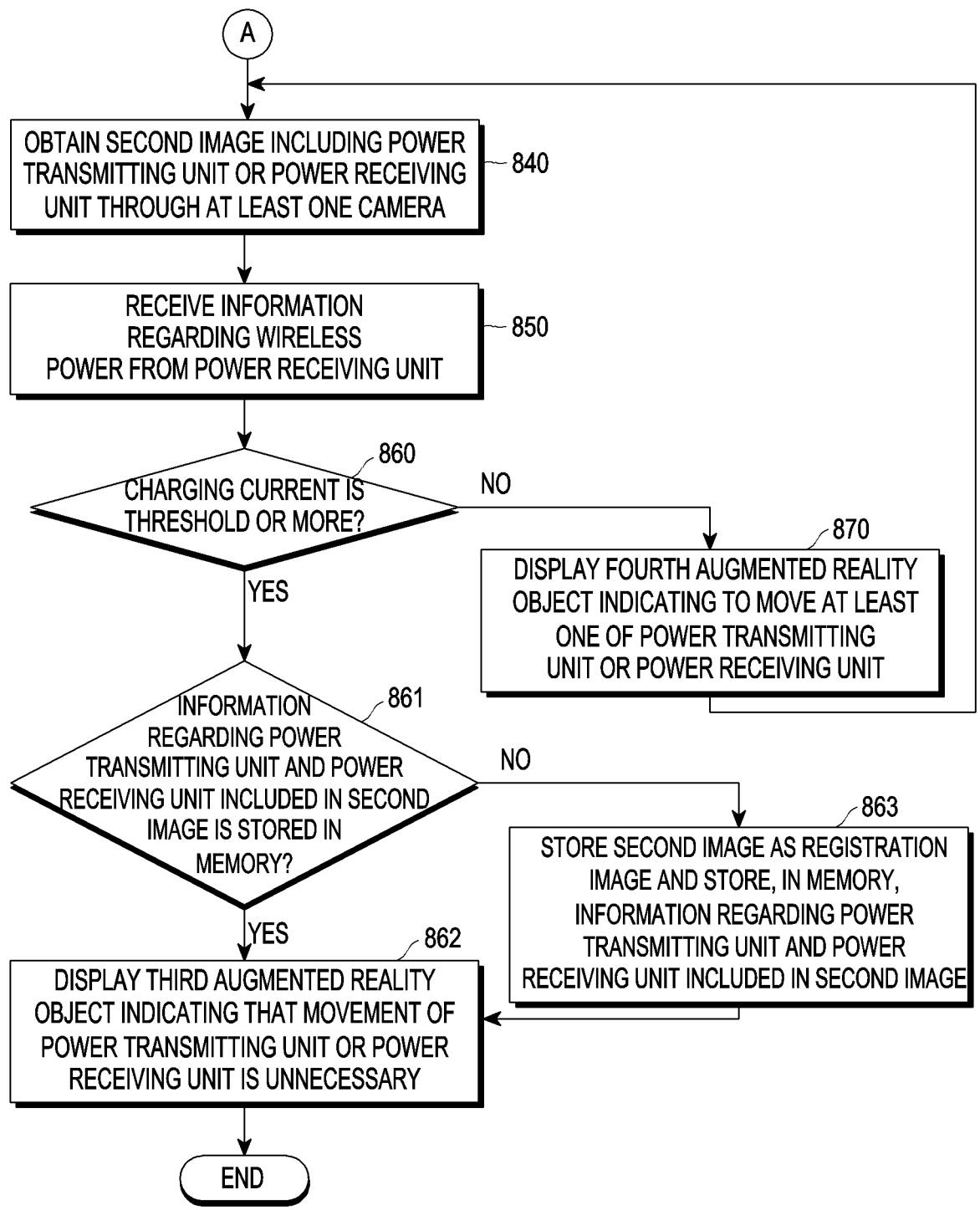

FIGS. 8A and 8B are flowcharts illustrating operations performed in an augmented reality device according to various embodiments. Although a description is made below with reference to the components of the augmented reality device 300 of FIG. 3, according to various embodiments, the augmented reality device performing the operations of FIGS. 8A and 8B is not limited to the augmented reality device 300 of FIG. 3, and the operations of FIGS. 8A and 8B may also be performed by the augmented reality device 200 of FIG. 2 and the electronic device 101 of FIG. 1.

In operation 810, at least one processor 310 of the augmented reality device 300 may obtain a first image through at least one camera (e.g., at least one of the first camera 331 or the third camera 333) and identify that at least one of a wireless power transmitter or a wireless power receiver is included in the first image.

According to various embodiments, the at least one processor 310 of the augmented reality device 300 may detect the shape of at least one of the wireless power transmitter or the wireless power receiver in the first image by analyzing the obtained first image. In this case, the at least one processor 310 may detect the shape of at least one of the wireless power transmitter and the wireless power receiver in the first image by referring to information regarding the shape of the wireless power transmitter and the wireless power receiver, stored in the memory of the augmented reality device 300.

According to various embodiments, the at least one processor 310 of the augmented reality device 300 may transmit the obtained first image to an external electronic device (e.g., a server) through the communication circuit 350 and, by receiving the result of an analysis of the first image from the external electronic device, identify that at least one of the wireless power transmitter or the wireless power receiver is included in the first image.

In operation 820, the at least one processor 310 of the augmented reality device 300 may identify whether information regarding at least one of the wireless power transmitter or the wireless power receiver is stored in the memory (e.g., the memory 380). According to various embodiments, the memory 380 may store information regarding the wireless power transmitter and the wireless power receiver to allow the charging current transferred to the wireless power receiver to be a threshold or more in operation 863 described below. According to various embodiments, the information regarding the wireless power transmitter and the wireless power receiver may include a registration image indicating an arrangement state of the wireless power transmitter and the wireless power receiver to allow the charging current transferred to the wireless power receiver to be the threshold or more. According to various embodiments, the information regarding the wireless power transmitter may include a registration image indicating the position of the transmission coil included in the wireless power transmitter or information indicating the position of the transmission coil. According to various embodiments, the information regarding the wireless power receiver may include a registration image indicating the position of the reception coil included in the wireless power receiver or information indicating the position of the reception coil.

According to various embodiments, when it is identified in operation 810 that both the wireless power transmitter and the wireless power receiver are included in the first image, if information regarding the wireless power transmitter and wireless power receiver is all stored in the memory 380 in operation 820, the at least one processor 310 may perform operation 821 and, if the information regarding the wireless power transmitter or the information regarding the wireless power receiver is not stored in the memory 380, the at least one processor 310 may perform operation 822.

According to various embodiments, when it is identified in operation 810 that one of the wireless power transmitter or the wireless power receiver is included in the first image, the at least one processor 310 may identify whether information regarding one of the wireless power transmitter or wireless power receiver included in the first image is stored in the memory 380 in operation 820 and, if the information regarding one of the wireless power transmitter or wireless power receiver included in the first image is stored in the memory 380, the at least one processor 310 may perform operation 821 and, if the information regarding one of the wireless power transmitter or wireless power receiver included in the first image is not stored in the memory 380, the at least one processor 310 may perform operation 822.

In operation 821, the at least one processor 310 may display a first augmented reality object indicating an arrangement of at least one of the wireless power transmitter or the wireless power receiver based on the registration image on the display (e.g., the right display 342 and/or the left display 344). When it is identified in operation 810 that one of the wireless power transmitter or wireless power receiver is included in the first image, the at least one processor 310 may display the first augmented reality object indicating a preferable arrangement of the wireless power receiver corresponding to the wireless power transmitter included in the first image or indicating a preferable arrangement of the wireless power transmitter corresponding to the wireless power receiver included in the first image, based on at least one of the registration image corresponding to one of the wireless power transmitter or wireless power receiver or information indicating the position of the coil. Examples of views seen through the displays 342 and 344 on which the first augmented reality object is displayed is illustrated in FIGS. 9A to 9C. Further, as described above with reference to FIGS. 11A and 11B, the first augmented reality object may be augmented reality objects 1190a, 1195a, 1190b, and 1195b stored when the charging status meets a specific charging status and/or when the charging efficiency is a threshold or more.

According to various embodiments, when it is identified in operation 810 that both the wireless power transmitter and wireless power receiver are included in the first image, the at least one processor 310 may display the first augmented reality object indicating a preferable arrangement of the wireless power receiver corresponding to the wireless power transmitter included in the first image or display the first augmented reality object indicating a preferable arrangement of the wireless power transmitter corresponding to the wireless power receiver included in the first image, based on a registration image corresponding to a combination of the wireless power transmitter and wireless power receiver.

In operation 822, the at least one processor 310 may analyze the first image to display a second augmented reality object indicating an arrangement of at least one of the wireless power transmitter or the wireless power receiver. According to various embodiments, the at least one processor 310 may analyze the first image, assume that the coil is positioned in a specific position inside the wireless power transmitter or wireless power receiver, e.g., the center of the wireless power transmitter or wireless power receiver, and display the second augmented reality object indicating the central position of the wireless power transmitter or wireless power receiver.

Figure 10A:
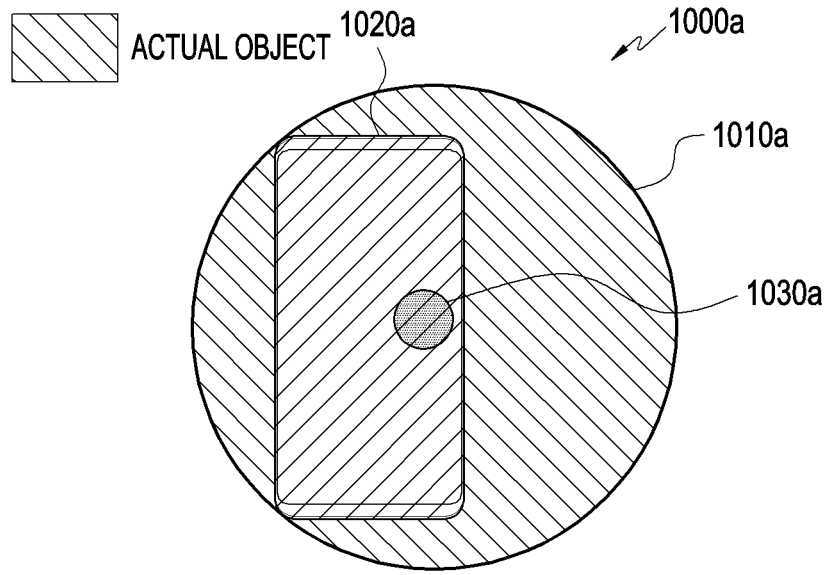
FIG. 10A illustrates an example view shown to a user through an augmented reality device according to various embodiments.
Figure 10B:
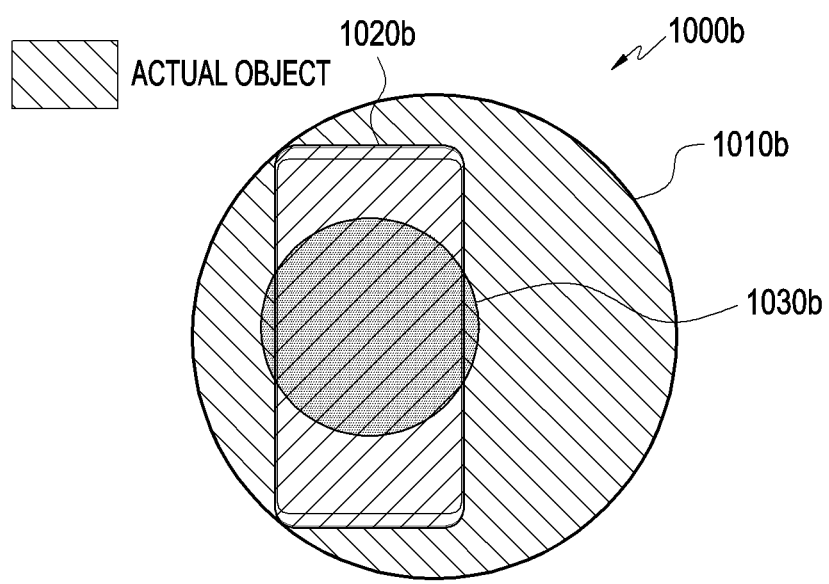
FIG. 10B illustrates an example view shown to a user through an augmented reality device according to various embodiments.

Examples of views seen through the displays 342 and 344 on which the second augmented reality object is displayed based on the analysis of the first image, not the registration image, are illustrated in FIGS. 10A and 10B. Referring to FIG. 10A, in the exemplary view 1000a, the wireless power transmitter 1010a and the wireless power receiver 1020a, which are actual objects, are included, and the second augmented reality object 1030a may be displayed in the central position of the wireless power transmitter 1010a based on the analysis of the first image corresponding to the exemplary view 1000a to lead the user to move the wireless power receiver 1020a to the position of the second augmented reality object 1030a.

Referring to FIG. 10B, in the exemplary view 1000b, the wireless power transmitter 1010b and the wireless power receiver 1020b, which are actual objects, are included, and the second augmented reality object 1030b may have a circular shape which is centered to the central position of the wireless power receiver 1020b based on the analysis of the first image corresponding to the exemplary view 1000b to lead the user to move the wireless power transmitter 1010b by referring to the position of the second augmented reality object 1030b.

In operation 830, the at least one processor 310 may identify that transmission of wireless power from the wireless power transmitter to the wireless power receiver has initiated. According to various embodiments, the at least one processor 310 may identify that transmission of wireless power has initiated by receiving a signal indicating that transmission of wireless power has initiated from the wireless power receiver through the communication circuit 350.

In operation 840, the at least one processor 310 may obtain a second image including the wireless power transmitter and wireless power receiver through at least one camera (e.g., at least one of the first camera 331 or the third camera 333).

In operation 850, the at least one processor 310 may receive information regarding wireless power from the wireless power receiver through the communication circuit 350. Details regarding operation 730 of FIG. 7 may be equally applied to operation 850.

In operation 860, the at least one processor 310 may identify whether the charging current supplied to the battery of the wireless power receiver is a threshold or more based on information regarding wireless power. According to various embodiments, the at least one processor 310 may receive a target value of the charging current from the wireless power receiver through the communication circuit 350 and set a value obtained by multiplying the target value of the charging current by a predetermined ratio, as the threshold. For example, when the target value of the charging current is 2700 mA and the predetermined ratio is 90%, 2430 mA may be the threshold.

When it is identified in operation 860 that the charging current supplied to the battery of the wireless power receiver is larger than or equal to the threshold, the at least one processor 310 may identify whether information regarding the wireless power transmitter and wireless power receiver included in the second image is stored in the memory 380. Unless the information regarding the wireless power transmitter and wireless power receiver included in the second image is stored in the memory 380, the at least one processor 310 may store the second image as a registration image and store the information regarding the wireless power transmitter and wireless power receiver included in the second image in the memory 380 in operation 863. If the information regarding the wireless power transmitter and wireless power receiver included in the second image is stored in the memory 380, the at least one processor 310 may perform operation 862 without performing operation 863.

In operation 862, the at least one processor 310 may overlay and display a third augmented reality object, which indicates that it is not necessary to move the wireless power transmitter and wireless power receiver, on the second image. The third augmented reality object may be, e.g., the fifth augmented reality object 1170a described in connection with 1103a of FIG. 11A or the fifth augmented reality object 1170b described in connection with 1103b of FIG. 11B.

When it is identified in operation 860 that the charging current supplied to the battery of the wireless power receiver is less than the threshold, the at least one processor 310 may overlay and display, on the second image, a fourth augmented reality object indicating to move at least one of the wireless power transmitter or wireless power receiver in operation 870. The fourth augmented reality object may include an augmented reality object indicating the current charging status and/or charging efficiency and/or an augmented reality object for guiding to the position of the wireless power receiver. For example, the fourth augmented reality object may be the augmented reality objects 1140a, 1150a, 1170a, and 1180a indicating the charging status and/or charging efficiency and/or the augmented reality object 1160a for guiding to the position of the wireless power receiver, described in connection with FIG. 11A, or the augmented reality objects 1140b, 1150b, 1170b, and 1180b indicating the charging status and/or charging efficiency and/or the augmented reality object 1160b for guiding to the position of the wireless power receiver, described in connection with FIG. 11B.

Figure 12:
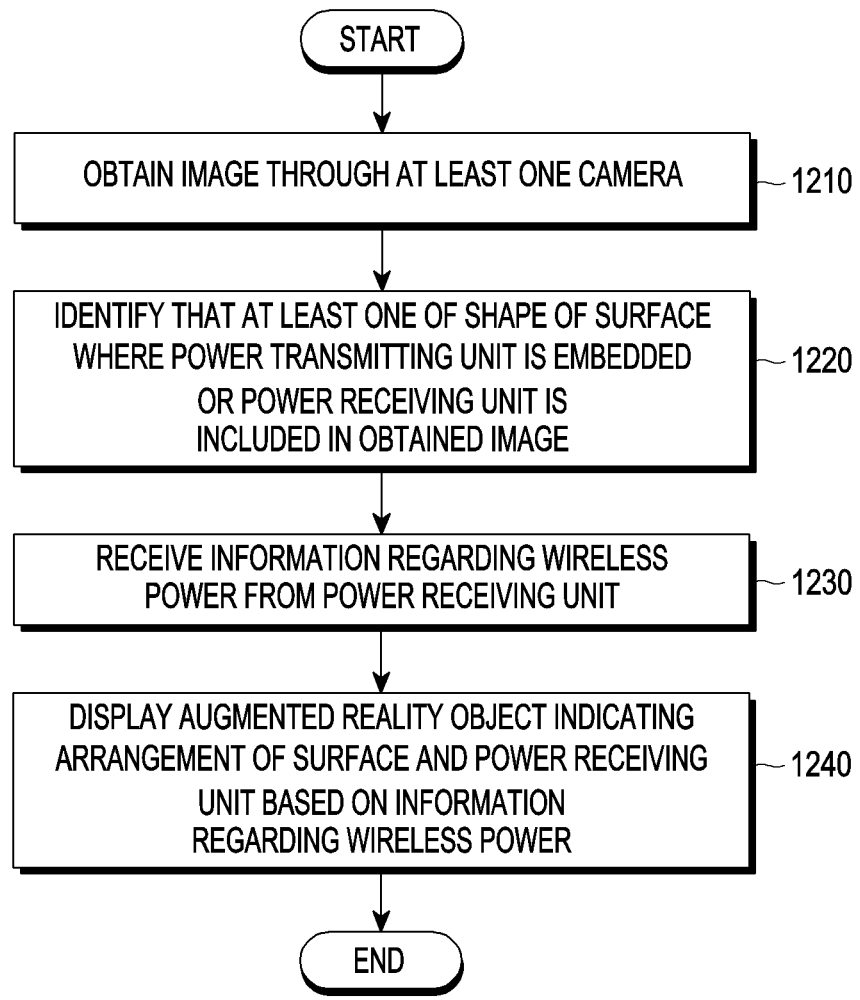
FIG. 12 is a flowchart illustrating operations performed in an augmented reality device according to various embodiments.

FIG. 12 is a flowchart illustrating operations performed in an augmented reality device according to various embodiments. Although a description is made below with reference to the components of the augmented reality device 300 of FIG. 3, according to various embodiments, the augmented reality device performing the operations of FIG. 12 is not limited to the augmented reality device 300 of FIG. 3, and the operations of FIG. 12 may also be performed by the augmented reality device 200 of FIG. 2 and the electronic device 101 of FIG. 1.

In operation 1210, at least one processor 310 of the augmented reality device 300 may obtain an image through at least one camera (e.g., at least one of the first camera 331 or the third camera 333).

In operation 1220, the at least one processor 310 of the augmented reality device 300 may identify that at least one of the shape of the surface where the wireless power transmitter is embedded or the wireless power receiver is included in the obtained image. According to various embodiments, the surface where the wireless power transmitter is embedded may be, e.g., a table in which the wireless power transmitter is embedded. According to various embodiments, the shape of the surface where the wireless power transmitter is embedded may include a figure and/or symbol indicating that the wireless power transmitter has been embedded, which is exposed on the surface of the table. According to various embodiments, the shape of the surface where the wireless power transmitter is embedded may include a figure indicating the area where the wireless power transmitter is embedded, which is exposed on the surface of the table.

According to various embodiments, the at least one processor 310 of the augmented reality device 300 may detect inclusion of at least one of the shape of the surface, where the wireless power transmitter is embedded, or the wireless power receiver in the obtained image by analyzing the obtained image. In this case, the at least one processor 310 may detect at least one of the shape of the wireless power transmitter-embedded surface or the shape of the wireless power receiver in the image by referring to information regarding the shape of the wireless power receiver and information regarding the shape of the wireless power transmitter-embedded surface, stored in the memory of the augmented reality device 300. According to various embodiments, the at least one processor 310 of the augmented reality device 300 may transmit the obtained image to an external electronic device (e.g., a server) through the communication circuit 350 and, by receiving the result of analysis of the obtained image from the external electronic device, identify that the shape of the wireless power transmitter-embedded surface or the shape of the wireless power receiver is included in the image.

In operation 1230, at least one processor 310 of the augmented reality device 300 may receive information regarding wireless power from the wireless power receiver through the communication circuit 350. Details regarding operation 730 of FIG. 7 may be equally applied to operation 1230.

In operation 1240, the at least one processor 310 of the augmented reality device 300 may display an augmented reality object indicating an arrangement of the surface and the wireless power receiver on the display (e.g., the right display 342 and/or the left display 344), based on the information regarding wireless power. Details regarding operation 740 of FIG. 7 may be equally applied to operation 1240.

According to various embodiments, an augmented reality device (e.g., the augmented reality device 300 of FIG. 3) may comprise a display (e.g., the right display 342 and the left display 344 of FIG. 3), at least one camera (e.g., the first camera 331, the second camera 332, and the third camera 333 of FIG. 3), a communication circuit (e.g., the communication circuit 350 of FIG. 3), and at least one processor (e.g., the processor 310 of FIG. 3) operatively connected with the display, the at least one camera, and the communication circuit. The at least one processor (e.g., the processor 310 of FIG. 3) may be configured to obtain a first image through the at least one camera (e.g., the first camera 331, the second camera 332, and the third camera 333 of FIG. 3), identify that a wireless power receiver and a wireless power transmitter configured to transmit wireless power to the wireless power receiver are included in the first image, receive information regarding the wireless power from the wireless power receiver through the communication circuit (e.g., the communication circuit 350 of FIG. 3), and display, on the display (e.g., the right display 342 and the left display 344 of FIG. 3), an augmented reality object indicating an arrangement of at least one of the wireless power transmitter or the wireless power receiver, based on the information regarding the wireless power.

According to various embodiments, the at least one processor (e.g., the processor 310 of FIG. 3) may be further configured to store the first image, as a registration image, in a memory (e.g., the memory 380 of FIG. 3) when the information regarding the wireless power indicates that a charging current supplied to a battery of the wireless power receiver by the wireless power is a threshold or more.

According to various embodiments, the at least one processor (e.g., the processor 310 of FIG. 3) may be further configured to store information regarding the wireless power transmitter and the wireless power receiver in the memory (e.g., the memory 380 of FIG. 3) when the information regarding the wireless power indicates that the charging current is the threshold or more.

According to various embodiments, the at least one processor (e.g., the processor 310 of FIG. 3) may be configured to obtain a second image through the at least one camera (e.g., the first camera 331, the second camera 332, and the third camera 333 of FIG. 3), identify that at least one of the wireless power transmitter or the wireless power receiver is included in the second image, identify whether information regarding at least one of the wireless power transmitter or the wireless power receiver included in the second image is stored in the memory (e.g., the memory 380 of FIG. 3), and display, on the display (e.g., the right display 342 and the left display 344 of FIG. 3), a first augmented reality object (e.g., the augmented reality objects 1190a, 1195a, 1190b, and 1195b of FIGS. 11A and 11B) indicating an arrangement of at least one of the wireless power transmitter or the wireless power receiver based on the registration image, as the augmented reality object, when the information regarding at least one of the wireless power transmitter or the wireless power receiver included in the second image is stored in the memory (e.g., the memory 380 of FIG. 3).

According to various embodiments, the at least one processor (e.g., the processor 310 of FIG. 3) may be configured to analyze the second image and display a second augmented reality object (e.g., the second augmented reality objects 1030a and 1030b of FIGS. 10A and 10B), as the augmented reality object, on the display (e.g., the right display 342 and the left display 344 of FIG. 3), when the information regarding at least one of the wireless power transmitter or the wireless power receiver included in the second image is not stored in the memory (e.g., the memory 380 of FIG. 3).

According to various embodiments, the second augmented reality object (e.g., the second augmented reality objects 1030a and 1030b of FIGS. 10A and 10B) may indicate a central position of at least one of the wireless power transmitter or the wireless power receiver.

According to various embodiments, the at least one processor (e.g., the processor 310 of FIG. 3) may be configured to display, on the display (e.g., the right display 342 and the left display 344 of FIG. 3), a third augmented reality object (e.g., the fifth augmented reality objects 1170a of 1103 of FIG. 11A or the fifth augmented reality object 1170b of 1103b of FIG. 11B) indicating that movement of the wireless power transmitter and the wireless power receiver is unnecessary, when the information regarding the wireless power indicates that a charging current supplied to a battery of the wireless power receiver by the wireless power is a threshold or more.

According to various embodiments, the at least one processor (e.g., the processor 310 of FIG. 3) may be configured to display, on the display (e.g., the right display 342 and the left display 344 of FIG. 3), a fourth augmented reality object (e.g., the augmented reality objects 1190a and 1195a of FIG. 11A or the augmented reality objects 1190b and 1195b of FIG. 11B) indicating to move at least one of the wireless power transmitter or the wireless power receiver, when the information regarding the wireless power indicates that a charging current supplied to a battery of the wireless power receiver by the wireless power is less than a threshold.

According to various embodiments, the at least one processor (e.g., the processor 310 of FIG. 3) may be configured to display, on the display (e.g., the right display 342 and the left display 344 of FIG. 3), a second augmented reality object (e.g., the augmented reality objects 1140a, 1150a, 1170a, and 1180a of FIG. 11A and the augmented reality objects 1140b, 1150b, 1170b, and 1180b of FIG. 11B) indicating a charging efficiency based on the information regarding the wireless power.

According to various embodiments, the information regarding the wireless power may indicate a charging current supplied to a battery of the wireless power receiver by the wireless power.

According to various embodiments, the information regarding the wireless power may further indicate at least one of a voltage of the battery of the wireless power receiver, a temperature of the battery, or information for charging efficiency.

According to various embodiments, the at least one processor (e.g., the processor 310 of FIG. 3) may be configured to display, on the display (e.g., the right display 342 and the left display 344 of FIG. 3), a second augmented reality object (e.g., the additional augmented reality object described in connection with operation 740) based on at least one of the voltage of the battery of the wireless power receiver, the temperature of the battery, or the information for the charging efficiency.

According to various embodiments, an augmented reality device (e.g., the augmented reality device 300 of FIG. 3) may comprise a display (e.g., the right display 342 and the left display 344 of FIG. 3), at least one camera (e.g., the first camera 331, the second camera 332, and the third camera 333 of FIG. 3), a communication circuit (e.g., the communication circuit 350 of FIG. 3), and at least one processor (e.g., the processor 310 of FIG. 3) operatively connected with the display, the at least one camera (e.g., the first camera 331, the second camera 332, and the third camera 333 of FIG. 3), and the communication circuit. The at least one processor (e.g., the processor 310 of FIG. 3) may be configured to obtain an image through the at least one camera (e.g., the first camera 331, the second camera 332, and the third camera 333 of FIG. 3), identify that at least one of a shape of a surface where a wireless power transmitter configured to transmit wireless power to a wireless power receiver or the wireless power receiver is included in the obtained image, receive information regarding the wireless power from the wireless power receiver through the communication circuit (e.g., the communication circuit 350 of FIG. 3), and display, on the display (e.g., the right display 342 and the left display 344 of FIG. 3), an augmented reality object indicating an arrangement of the surface and the wireless power receiver, based on the information regarding the wireless power.

According to various embodiments, a method performed in an augmented reality device (e.g., the augmented reality device 300 of FIG. 3) may comprise obtaining a first image through at least one camera (e.g., the first camera 331, the second camera 332, and the third camera 333 of FIG. 3) of the augmented reality device (e.g., the augmented reality device 300 of FIG. 3), identifying that at least one of a wireless power transmitter configured to transmit wireless power to a wireless power receiver or the wireless power receiver is included in the first image, receiving information regarding the wireless power from the wireless power receiver through a communication circuit (e.g., the communication circuit 350 of FIG. 3) of the augmented reality device (e.g., the augmented reality device 300 of FIG. 3), and displaying, on a display (e.g., the right display 342 and the left display 344 of FIG. 3), an augmented reality object indicating an arrangement of at least one of the wireless power transmitter or the wireless power receiver, based on the information regarding the wireless power.

According to various embodiments, the method may further comprise storing the first image, as a registration image, in a memory of the augmented reality device (e.g., the augmented reality device 300 of FIG. 3) when the information regarding the wireless power indicates that a charging current supplied to a battery of the wireless power receiver by the wireless power is a threshold or more.

According to various embodiments, the method may further comprise storing information regarding the wireless power transmitter and the wireless power receiver in the memory when the information regarding the wireless power indicates that the charging current is the threshold or more.

According to various embodiments, the method may further comprise obtaining a second image through the at least one camera (e.g., the first camera 331, the second camera 332, and the third camera 333 of FIG. 3), identifying that at least one of the wireless power transmitter or the wireless power receiver is included in the second image, identifying whether information regarding at least one of the wireless power transmitter or the wireless power receiver included in the second image is stored in the memory, and displaying, on the display (e.g., the right display 342 and the left display 344 of FIG. 3), a first augmented reality object (e.g., the augmented reality objects 1190a, 1195a, 1190b, and 1195b of FIGS. 11A and 11B) indicating an arrangement of at least one of the wireless power transmitter or the wireless power receiver based on the registration image, as the augmented reality object, when the information regarding at least one of the wireless power transmitter or the wireless power receiver included in the second image is stored in the memory.

According to various embodiments, the method may further comprise analyzing the second image and displaying a second augmented reality object (e.g., the second augmented reality object 1030a or 1030b of FIGS. 10A and 10B), as the augmented reality object, on the display (e.g., the right display 342 and the left display 344 of FIG. 3), when the information regarding at least one of the wireless power transmitter or the wireless power receiver included in the second image is not stored in the memory.

According to various embodiments, the method performed in the augmented reality device (e.g., the augmented reality device 300 of FIG. 3) may further comprise displaying a third augmented reality object (e.g., the fifth augmented reality objects 1170a of 1103 of FIG. 11A or the fifth augmented reality object 1170b of 1103b of FIG. 11B) indicating that movement of at least one of the wireless power transmitter or the wireless power receiver is unnecessary, when the information regarding the wireless power indicates that a charging current supplied to a battery of the wireless power receiver by the wireless power is a threshold or more.

According to various embodiments, the method performed in the augmented reality device (e.g., the augmented reality device 300 of FIG. 3) may further comprise displaying a fourth augmented reality object (e.g., the augmented reality objects 1190a and 1195a of FIG. 11A or the augmented reality objects 1190b and 1195b of FIG. 11B) indicating to move at least one of the wireless power transmitter or the wireless power receiver, when the information regarding the wireless power indicates that a charging current supplied to a battery of the wireless power receiver by the wireless power is less than a threshold.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An augmented reality device, comprising,
a display,
at least one camera,
a communication circuit, and
at least one processor operatively connected with the display, the at least one camera, and the communication circuit,
wherein the at least one processor is configured to:
obtain a first image through the at least one camera,
identify that a wireless power receiver and a wireless power transmitter configured to transmit wireless power to the wireless power receiver are included in the first image,
receive information regarding the wireless power from the wireless power receiver through the communication circuit, and
display, on the display, an augmented reality object indicating an arrangement of at least one of the wireless power transmitter or the wireless power receiver, based on the information regarding the wireless power.

2. The augmented reality device of claim 1, wherein the at least one processor is further configured to:

store the first image, as a registration image, in a memory when the information regarding the wireless power indicates that a charging current supplied to a battery of the wireless power receiver by the wireless power is a threshold or more.

3. The augmented reality device of claim 2, wherein the at least one processor is further configured to:
store information regarding the wirelesspower transmitter and the wirelesspower receiver in the memory when the information regarding the wireless power indicates that the charging current is the threshold or more.

4. The augmented reality device of claim 2, wherein the at least one processor is configured to:
obtain a second image through the at least one camera,
identify that at least one of the wireless power transmitter or the wireless power receiver is included in the second image,
identify whether information regarding at least one of the wireless power transmitter or the wireless power receiver included in the second image is stored in the memory, and
display, on the display, a first augmented reality object indicating an arrangement of at least one of the wirelesspower transmitter or the wirelesspower receiver based on the registration image, as the augmented reality object, when the information regarding at least one of the wirelesspower transmitter or the wirelesspower receiver included in the second image is stored in the memory.

5. The augmented reality device of claim 4, wherein the at least one processor is configured to:
analyze the second image and display a second augmented reality object, as the augmented reality object, on the display, when the information regarding at least one of the wirelesspower transmitter or the wirelesspower receiver included in the second image is not stored in the memory.

6. The augmented reality device of claim 5, wherein the second augmented reality object indicates a central position of at least one of the wireless power transmitter or the wirelesspower receiver.

7. The augmented reality device of claim 1, wherein the at least one processor is configured to:
display, on the display, a third augmented reality object indicating that movement of the wirelesspower transmitter and the wirelesspower receiver is unnecessary, when the information regarding the wireless power indicates that a charging current supplied to a battery of the wirelesspower receiver by the wireless power is a threshold or more.

8. The augmented reality device of claim 1, wherein the at least one processor is configured to:
display, on the display, a fourth augmented reality object indicating to move at least one of the wirelesspower transmitter or the wireless power receiver, when the information regarding the wireless power indicates that a charging current supplied to a battery of the wireless power receiver by the wireless power is less than a threshold.

9. The augmented reality device of claim 1, wherein the at least one processor is configured to display, on the display, a second augmented reality object indicating a charging efficiency based on the information regarding the wireless power.

10. The augmented reality device of claim 1, wherein the information regarding the wireless power indicates a charging current supplied to a battery of the wirelesspower receiver by the wireless power.

11. The augmented reality device of claim 10, wherein the information regarding the wireless power further indicates at least one of a voltage of the battery of the wireless power receiver, a temperature of the battery, or information for charging efficiency.

12. The augmented reality device of claim 11, wherein the at least one processor is configured to:
display, on the display, a second augmented reality object based on at least one of the voltage of the battery of the wireless power receiver, the temperature of the battery, or the information for the charging efficiency.

13. A method performed in an augmented reality device, comprising,
obtaining a first image through at least one camera of the augmented reality device,
identifying that at least one of a wirelesspower transmitter configured to transmit wireless power to a wirelesspower receiver or the wirelesspower receiver is included in the first image,
receiving information regarding the wireless power from the wirelesspower receiver through a communication circuit of the augmented reality device, and
displaying, on a display, an augmented reality object indicating an arrangement of at least one of the wirelesspower transmitter or the wirelesspower receiver, based on the information regarding the wireless power.

14. The method of claim 13, further comprising:
storing the first image, as a registration image, in a memory of the augmented reality device when the information regarding the wireless power indicates that a charging current supplied to a battery of the wirelesspower receiver by the wireless power is a threshold or more.

15. The method of claim 14, further comprising storing information regarding the wirelesspower transmitter and the wirelesspower receiver in the memory when the information regarding the wireless power indicates that the charging current is the threshold or more.

16. The method of claim 14, further comprising
obtaining a second image through the at least one camera,
identifying that at least one of the wirelesspower transmitter or the wirelesspower receiver is included in the second image,
identifying whether information regarding at least one of the wirelesspower transmitter or the wirelesspower receiver included in the second image is stored in the memory, and
displaying, on the display, a first augmented reality object indicating an arrangement of at least one of the wirelesspower transmitter or the wirelesspower receiver based on the registration image, as the augmented reality object, when the information regarding at least one of the wirelesspower transmitter or the wirelesspower receiver included in the second image is stored in the memory.

17. The method of claim 16, further comprising,
analyzing the second image and displaying a second augmented reality object, as the augmented reality object, on the display, when the information regarding at least one of the wirelesspower transmitter or the wirelesspower receiver included in the second image is not stored in the memory.

18. The method of claim 13, further comprising displaying a third augmented reality object indicating that movement of at least one of the wirelesspower transmitter or the wireless power receiver is unnecessary, when the information regarding the wireless power indicates that a charging current supplied to a battery of the wireless power receiver by the wireless power is a threshold or more.

19. The method of claim 13, further comprising displaying a fourth augmented reality object indicating to move at least one of the wirelesspower transmitter or the wireless power receiver, when the information regarding the wireless power indicates that a charging current supplied to a battery of the wireless power receiver by the wireless power is less than a threshold.

20. An augmented reality device, comprising, a display, at least one camera, a communication circuit, and at least one processor operatively connected with the display, the at least one camera, and the communication circuit, wherein the at least one processor is configured to:

obtain an image through the at least one camera, identify that at least one of a shape of a surface where a wirelesspower transmitter configured to transmit wireless power to a wirelesspower receiver or the wirelesspower receiver is included in the obtained image, receive information regarding the wireless power from the wirelesspower receiver through the communication circuit, and display, on the display, an augmented reality object indicating an arrangement of the surface and the wirelesspower receiver, based on the information regarding the wireless power.

\* \* \* \* \*